(12) United States Patent
Watanabe et al.

(10) Patent No.: US 11,619,484 B2
(45) Date of Patent: Apr. 4, 2023

(54) DISTANCE MEASUREMENT SYSTEM, DISTANCE MEASUREMENT METHOD, AND PROGRAM RECORDING MEDIUM

(71) Applicant: NEC Corporation, Tokyo (JP)

(72) Inventors: Go Watanabe, Tokyo (JP); Fujio Okumura, Tokyo (JP); Shigeru Asai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1050 days.

(21) Appl. No.: 16/334,852

(22) PCT Filed: Sep. 15, 2017

(86) PCT No.: PCT/JP2017/033421
§ 371 (c)(1),
(2) Date: Mar. 20, 2019

(87) PCT Pub. No.: WO2018/056199
PCT Pub. Date: Mar. 29, 2018

(65) Prior Publication Data
US 2020/0025882 A1   Jan. 23, 2020

(30) Foreign Application Priority Data

Sep. 21, 2016   (JP) .............................. JP2016-184075

(51) Int. Cl.
*G01S 7/481*   (2006.01)
*G01S 7/484*   (2006.01)
(Continued)

(52) U.S. Cl.
CPC .......... *G01B 11/2513* (2013.01); *G01S 7/484* (2013.01); *G01S 7/4814* (2013.01);
(Continued)

(58) Field of Classification Search
CPC ........ G01S 7/4814; G01S 7/484; G01S 17/10; G01S 17/89; G01S 17/931; G01S 7/4815;
(Continued)

(56) References Cited

U.S. PATENT DOCUMENTS

| 9,239,959 B1 * | 1/2016 | Evans ..................... G01S 17/89 |
| 2012/0242972 A1 * | 9/2012 | Wee ......................... G01S 7/486 356/4.01 |

(Continued)

FOREIGN PATENT DOCUMENTS

| JP | 59-198377 A | 11/1984 |
| JP | 6-118161 A | 4/1994 |

(Continued)

OTHER PUBLICATIONS

International Search Report for PCT/JP2017/033421 dated Dec. 12, 2017 [PCT/ISA/210].

(Continued)

*Primary Examiner* — Daniel L Murphy
(74) *Attorney, Agent, or Firm* — Sughrue Mion, PLLC

(57) ABSTRACT

In order to reliably detect a target object located within a projection area and measure a distance to the detected target object, a distance measurement system includes: a light emitting device including a phase-modulation-type spatial light modulator element, and configured to emit projected light for forming a pattern associated with a phase distribution displayed on a display part of the spatial light modulator (Continued)

element, toward at least two projection areas; a light receiving device for capturing an area including a pattern to be formed by projected light emitted by the light emitting device; and a control device for controlling light emission from the light emitting device, verifying, for each projection area, presence or absence of a target object within the projection area by analyzing imaging data captured by the light receiving device, and measuring a distance to a detected target object.

16 Claims, 24 Drawing Sheets

(51) Int. Cl.
*G01S 17/10* (2020.01)
*G01B 11/25* (2006.01)
*G01S 17/931* (2020.01)
*G01S 17/89* (2020.01)

(52) U.S. Cl.
CPC .............. *G01S 17/10* (2013.01); *G01S 17/89* (2013.01); *G01S 17/931* (2020.01)

(58) Field of Classification Search
CPC .......... G01S 17/04; G01S 17/06; G01S 17/08; G01S 17/26; G01S 17/32; G01S 17/34; G01S 17/36; G01S 17/88; G01S 17/894; G01S 17/93; G01S 17/935; G01S 17/95; G01S 17/936; G01B 11/2513; G01C 3/06
USPC ....................................................... 356/5.01
See application file for complete search history.

(56) References Cited

U.S. PATENT DOCUMENTS

| 2015/0009695 | A1* | 1/2015 | Christmas | G01S 17/931 |
| | | | | 362/466 |
| 2015/0131080 | A1* | 5/2015 | Retterath | G01S 17/10 |
| | | | | 356/5.01 |
| 2016/0003946 | A1* | 1/2016 | Gilliland | G01S 17/894 |
| | | | | 356/5.01 |
| 2016/0327636 | A1* | 11/2016 | Gazit | G01S 7/4972 |
| 2018/0067195 | A1* | 3/2018 | Slobodyanyuk | G01S 7/4815 |
| 2018/0073924 | A1* | 3/2018 | Steinmann | G01S 17/04 |
| 2018/0088236 | A1* | 3/2018 | Eichenholz | H01S 3/06733 |

FOREIGN PATENT DOCUMENTS

| JP | 8-152320 A | 6/1996 |
| JP | 8-220230 A | 8/1996 |
| JP | 2014178245 A | 9/2014 |
| JP | 2015-509208 A | 3/2015 |
| WO | 2015/049866 A1 | 4/2015 |

OTHER PUBLICATIONS

Written Opinion International Search Report for PCT/JP2017/033421 dated Dec. 12, 2017 [PCT/ISA/237].

Communication dated Sep. 23, 2020, from the Japanese Patent Office in application No. 2018-541035.

* cited by examiner

DISTANCE MEASUREMENT SYSTEM, DISTANCE MEASUREMENT METHOD, AND PROGRAM RECORDING MEDIUM

CROSS REFERENCE TO RELATED APPLICATIONS

This application is a National Stage of International Application No. PCT/JP2017/033421, filed on Sep. 15, 2017, which claims priority from Japanese Patent Application No. 2016-184075, filed on Sep. 21, 2016, the contents of all of which are incorporated herein by reference in their entirety.

TECHNICAL FIELD

The present invention relates to a distance measurement device, a distance measurement method, and a distance measurement program for measuring a distance to a target object. In particular, the present invention relates to a distance measurement system, a distance measurement method, and a program for measuring a distance from a traveling vehicle to a target object.

BACKGROUND ART

Vehicles mounted with a device (hereinafter, a distance measurement device) for measuring a distance to a target object on a road are increasing for the purpose of checking a road condition and avoiding a collision. Among distance measurement devices of various methods, a device for measuring a distance by using laser is superior in terms of accuracy. For example, as one of methods for measuring a distance by using laser, there is a method in which laser is emitted toward a road, and light reflected from the road is received. In a distance measurement device using laser, it is possible to measure a distance to a target object by employing a triangulation method or a time-of-flight method.

Since a distance measurement device mounted with a general projector does not have a mechanically operating mechanism, the device has an advantage of being strong against vibration. There is an issue that, however, when the general projector is employed alone, power efficiency may be lowered since laser is continued to be radiated onto an entire surface of an area to be radiated, or resolution may be lowered when a large range is covered.

PTL 1 discloses an obstacle detection device for a vehicle, which detects an obstacle in a predetermined direction of a traveling vehicle by using laser light. The device in PTL 1 includes two or more light sources for diverging laser light at different divergence angles.

PTL 2 discloses a light sensing device capable of radiating light onto a target object, and acquiring information relating to the target object from reflected or scattered light of the target object. In the device in PTL 2, by deforming/converting a light transmitting pattern by a diffraction grating disposed in front of a laser light source, a required light transmitting pattern is acquired regardless of a simple optical system.

PTL 3 discloses an interface device capable of capturing reflected light of light radiated in a plurality of directions. Since the device in PTL 3 is able to radiate light in a plurality of directions regardless of a single light emitting device, the device is able to radiate an image of a high resolution in a wide range with good power efficiency.

CITATION LIST

Patent Literature

[PTL 1] Japanese Unexamined Patent Application Publication No. S59-198377
[PTL 2] Japanese Unexamined Patent Application Publication No. H6-118161
[PTL 3] International Publication No. WO 2015/049866

SUMMARY OF INVENTION

Technical Problem

In the device in PTL 1, since laser light is diverged from a plurality of light sources at different divergence angles, the device is able to reduce a blind spot of laser light. In the device in PTL 1, however, there is an issue that it is necessary to mount a plurality of projectors, since it is necessary to dispose a projector at each distance.

The device in PTL 2 is able to project minus first-order light, zero-order light, and plus first-order light included in light emitted from a single light source in different directions with a simple configuration. In the device in PTL 2, however, there is an issue that, although it is possible to transmit light of a fixed pattern in a different direction, it is not possible to change a pattern for each direction depending on a condition.

The device in PTL 3 is able to radiate light of any pattern in a plurality of directions regardless of a single device. When the devices in PTLs 1 to 3 are combined, it is possible to transmit light of any pattern in a different direction regardless of a single light source. When the devices in PTLs 1 to 3 are combined, however, there is an issue that it may not be possible to accurately acquire a distance to a target object, since reflected light of light radiated in a plurality of directions interferes with one another.

In order to solve the above-described issues, an object of the present invention is to provide a distance measurement device capable of reliably detecting a target object located in a light projection area, and measuring a distance to the detected target object.

Solution to Problem

A distance measurement system according to the present invention includes: a light emitting device including a phase-modulation-type spatial light modulator element, and configured to emit projected light for forming a pattern associated with a phase distribution displayed on a display part of the spatial light modulator element, toward at least two projection areas; a light receiving device for capturing an area including a pattern to be formed by projected light emitted by the light emitting device; and a control device for controlling light emission from the light emitting device, verifying, for each projection area, presence or absence of a target object within the projection area by analyzing imaging data captured by the light receiving device, and measuring a distance to a detected target object.

In a distance measurement method according to the present invention, projected light for forming a pattern associated with a phase distribution displayed on a display part of a phase-modulation-type spatial light modulator element is emitted toward at least two projection areas, an area including a pattern to be formed by emitted projected light is captured, presence or absence of a target object within the projection area is verified for each projection area by analyzing captured imaging data, and a distance to a detected target object is measured.

A distance measurement program according to the present invention causes a computer to execute: processing of emitting projected light for forming a pattern associated with a phase distribution displayed on a display part of a phase-modulation-type spatial light modulator element, toward at least two projection areas; processing of capturing an area including a pattern to be formed by emitted projected light; processing of verifying, for each projection area, presence or absence of a target object within the projection area by analyzing captured imaging data; and processing of measuring a distance to a detected target object.

Advantageous Effects of Invention

According to the present invention, it is possible to provide a distance measurement device capable of reliably detecting a target object located in a light projection area, and measuring a distance to the detected target object.

EXAMPLE EMBODIMENT

In the following, example embodiments for implementing the present invention are described using the drawings.

Below-described example embodiments include technically preferred limitations for implementing the present invention. The scope of the invention, however, is not limited to the following. Note that, in all drawings for use in describing the following example embodiments, unless there is particularly a reason, similar elements are indicated with same reference numbers. Further, in the following example embodiments, repeated description on a similar configuration/operation may be omitted.

(First Example Embodiment)

[Configuration]

First, a configuration of a distance measurement system according to a first example embodiment of the present invention is described with reference to the drawings.

Figure 1:
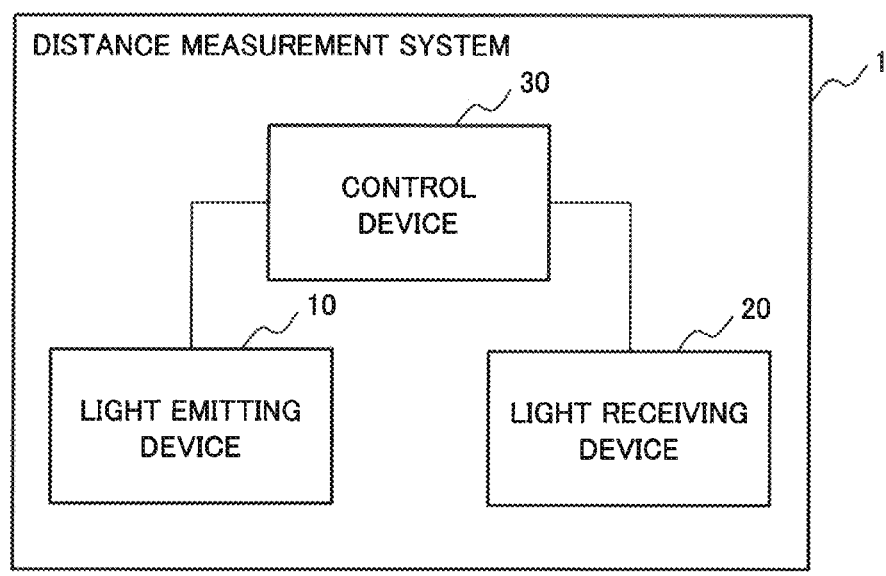
FIG. 1 is a block diagram illustrating a configuration of a distance measurement system according to a first example embodiment of the present invention.
Figure 2:
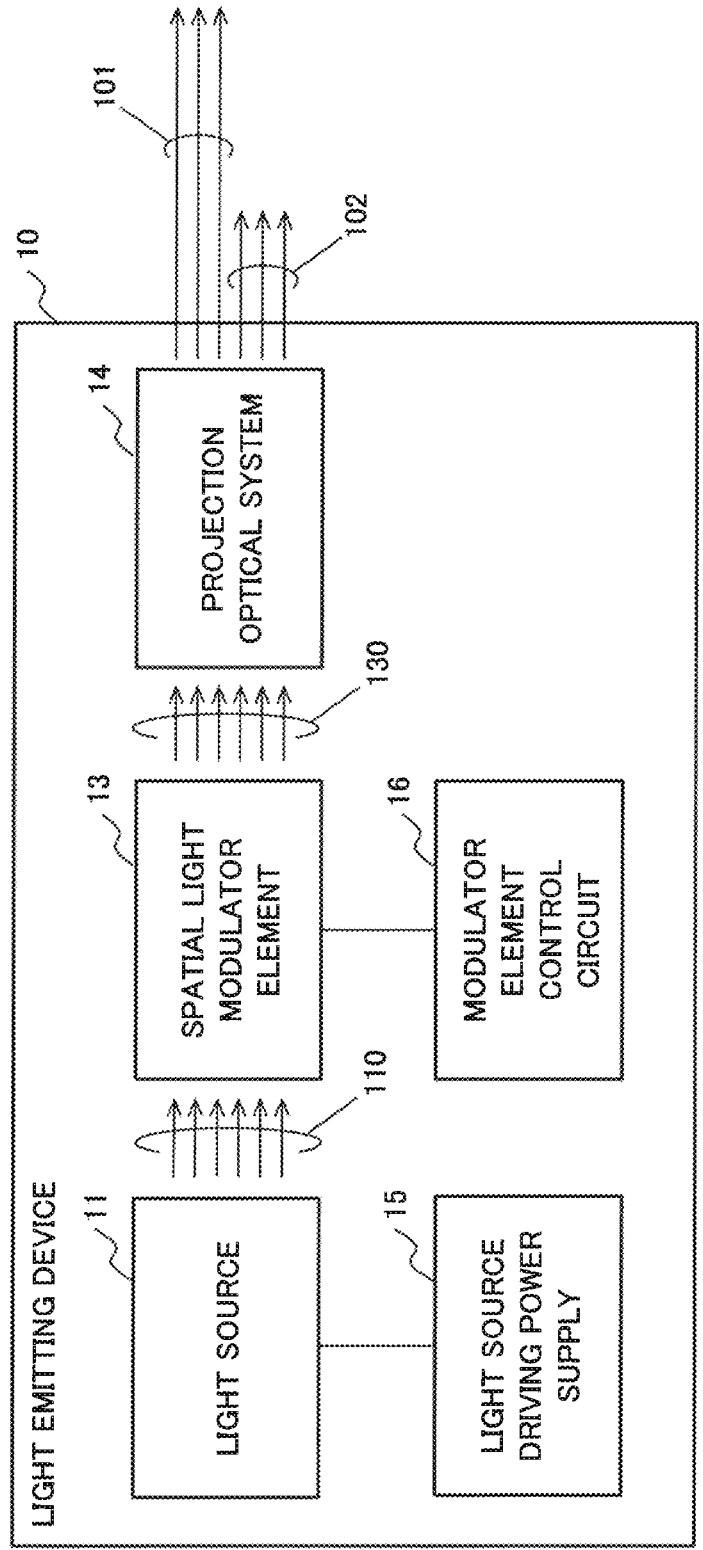
FIG. 2 is a conceptual diagram illustrating a configuration of a light emitting device in the distance measurement system according to the first example embodiment of the present invention.
Figure 3:
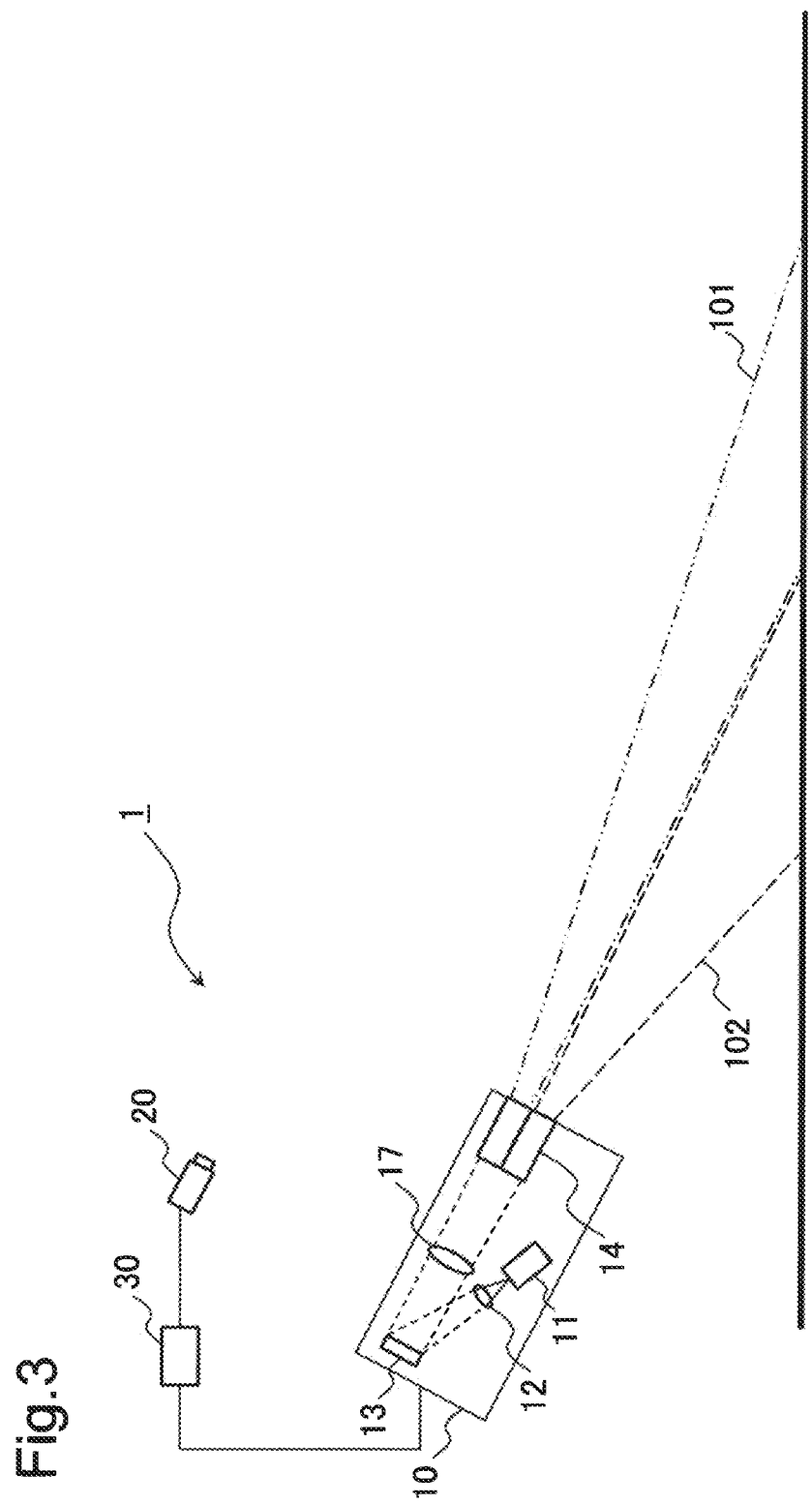
FIG. 3 is a conceptual diagram illustrating a configuration of the distance measurement system according to the first example embodiment of the present invention.

FIG. 1 is a block diagram illustrating a configuration of a distance measurement system 1 of the present example embodiment. FIG. 2 is a conceptual diagram illustrating a configuration of a light emitting device 10. FIG. 3 is a conceptual diagram illustrating a spatial positional relationship between the light emitting device 10 and a light receiving device 20, and illustrating an overview of an inner configuration of the light emitting device 10. Note that FIGS. 1 to 3 are conceptual diagrams, and do not always accurately illustrate a spatial positional relationship among each constituent element, and a state of progress of light.

As illustrated in FIG. 1, the distance measurement system 1 includes the light emitting device 10, the light receiving device 20, and a control device 30.

The light emitting device 10 is connected to the control device 30. The light emitting device 10 includes a phase-modulation-type spatial light modulator element. The light emitting device 10 emits projected light associated with at least two distances in response to control of the control device 30. For example, the light emitting device 10 emits long-distance projected light (first projected light) toward a projection area (first projection area) at a far distance (first distance), and short-distance projected light (second projected light) toward a projection area (second projection area) at a near distance (second distance). First projected light and second projected light form, on a surface to be projected, pattern light (hereinafter, simply described as a pattern) in which a plurality of marks are aligned. In other words, the above-described plurality of marks are elements of pattern light. Note that, in the following, an example is described in which projected light is projected onto different projection areas located at different distances from the distance measurement system 1. Note that the distance measurement system 1 is also able to project projected light onto different projection areas located at a same distance.

The light receiving device 20 is connected to the control device 30. The light receiving device 20 captures an area including a first projection area and a second projection area in response to control of the control device 30. The light receiving device 20 includes an imaging element similar to a general digital camera.

The control device 30 is connected to the light emitting device 10 and the light receiving device 20. The control device 30 controls the light emitting device 10 in such a way as to emit first projected light and second projected light. Further, the control device 30 controls the light receiving device 20 in such a way as to capture an area including a first projection area and a second projection area. The control device 30 verifies presence or absence of a target object in each projection area by analyzing a pattern included in a captured area. When the control device 30 detects a target object, the control device 30 measures a distance to the target object.

As illustrated in FIG. 2, the light emitting device 10 includes a light source 11, a spatial light modulator element 13, a projection optical system 14, a light source driving power supply 15, and a modulator element control circuit 16. Note that, although illustration is omitted in FIG. 2, as illustrated in FIG. 3, the light emitting device 10 includes a collimator 12 and a Fourier transform lens 17. In FIG. 2, since the collimator 12 is omitted, it is illustrated as if parallel light 110 is emitted from the light source 11. Actually, light emitted from the light source 11 is converted into parallel light 110 by the collimator 12. Then, light reflected on a display surface of the spatial light modulator element 13 is collected onto a desired focal point position by the Fourier transform lens 17.

As illustrated in FIG. 3, preferably, the light emitting device 10 and the light receiving device 20 are disposed at positions away from each other. This is because, when a triangulation method is employed in measuring a distance to a target object, it is possible to accurately measure the distance when the light emitting device 10 and the light receiving device 20 are away from each other. For example, when the distance measurement system 1 is mounted in a vehicle, the light emitting device 10 may be disposed in a front portion of the vehicle, and the light receiving device 20 may be disposed in an upper portion of the vehicle. Note that positions where the light emitting device 10 and the light receiving device 20 are disposed may be set as necessary.

The light source 11 emits light of a specific wavelength accompanied by driving of the light source driving power supply 15. Light emitted from the light source 11 becomes parallel light 110 by the collimator 12. Parallel light 110 is converted into modulated light 130 when being reflected on a display part of the spatial light modulator element 13, and is guided to the projection optical system 14. Modulated light 130 is converted into projected light by the projection optical system 14, and is projected as long-distance projected light 101 and short-distance projected light 102 from the projection optical system 14.

The light source 11 emits light of a specific wavelength. Light to be emitted from the light source 11 is preferably coherent light in which phases are aligned. For example, a laser light source may be employed as the light source 11. Note that, as far as coherent light in which phases are aligned is acquired, the light source 11 may be a light emitting diode, an incandescent light bulb, a discharge tube, or the like.

In the present example embodiment, preferably, the light source 11 is configured to emit light in an infrared range so that projected light is not visually recognized. For example, the light source 11 may be configured to emit light in a visible range or an ultraviolet range. Further, for example, visible light may be used in a condition that laser light is radiated in a pulse manner, and integration of an amount of radiation of laser light per unit time cannot be visually recognized by a human. Further, also in a case where radiation of laser light is allowed to be visually recognized, and in a case where radiation of laser light is intended to be visually recognized, visible light may be used.

The spatial light modulator element 13 displays, on the display part of an own device, an image for generating a pattern to be formed by light to be projected as long-distance projected light 101 and short-distance projected light 102 in response to control of the control device 30. In the present example embodiment, parallel light 110 is radiated onto the display part of the spatial light modulator element 13 in a state an image for forming a desired pattern is displayed on the display part. The spatial light modulator element 13 emits modulated light 130 acquired by modulating parallel light 110 toward the projection optical system 14.

In the present example embodiment, an image for generating a pattern to be formed by each of long-distance projected light 101 and short-distance projected light 102 is caused to be displayed on the display part of the spatial light modulator element 13. Specifically, the display part of the spatial light modulator element 13 is allocated to a first pixel group for displaying an image associated with a pattern to be formed by long-distance projected light 101, and a second pixel group for displaying an image associated with a pattern to be formed by short-distance projected light 102. Details of an image to be displayed on the display part of the spatial light modulator element 13 will be described later.

The spatial light modulator element 13 is implementable by a phase-modulation-type spatial light modulator element for receiving incidence of coherent parallel light 110 in which phases are aligned, and modulating a phase of the incident parallel light 110. Since the phase-modulation-type spatial light modulator element 13 is focus-free, it is not necessary to change a focal point at each distance, even when light is projected at a plurality of projection distances. Note that the spatial light modulator element 13 may be an element of a type different from a phase modulation type. In the following, however, description is made based on a premise that a phase-modulation-type spatial light modulator element is employed. Hereinafter, it is assumed that a phase-modulation-type spatial light modulator element is employed, and an image for generating a pattern to be formed in each projection area has a phase distribution.

The display part of the phase-modulation-type spatial light modulator 13 is constituted of a plurality of pixels, and a phase distribution of a pattern to be formed by long-distance projected light 101 and short-distance projected light 102 is displayed on one of the pixels. In the present example embodiment, a plurality of pixels constituting the display part of the spatial light modulator element 13 are allocated to a pixel group (first pixel group) for displaying a pattern for long-distance projected light 101, and a pixel group (second pixel group) for displaying a pattern for short-distance projected light 102. Specifically, a phase distribution for long-distance projected light 101 is displayed on a first pixel group, and a phase distribution of short-distance projected light 102 is displayed on a second pixel group.

The spatial light modulator element 13 is implemented by a spatial light modulator element employing a ferroelectric liquid crystal, a homogeneous liquid crystal, a vertical orientation liquid crystal, or the like, for example. Specifically, the spatial light modulator element 13 is implementable by a liquid crystal on silicon (LCOS). Further, the spatial light modulator element 13 may be implemented by a micro electro mechanical system (MEMS), for example.

Employing the phase-modulation-type spatial light modulator element 13 enables to concentrate energy on a portion of display-information by operating in such a way as to successively switch a portion where projected light is projected. Therefore, the phase-modulation-type spatial light modulator element 13 is able to display display-information brightly as compared with a method for projecting light onto an entire surface of a display area, as far as an output of a light source is the same.

The projection optical system 14 is an optical system for projecting modulated light 130 modulated by the spatial light modulator element 13 as projected light. Modulated light 130 modulated by the spatial light modulator element 13 is projected as long-distance projected light 101 and short-distance projected light 102 by the projection optical system 14.

Figure 4:
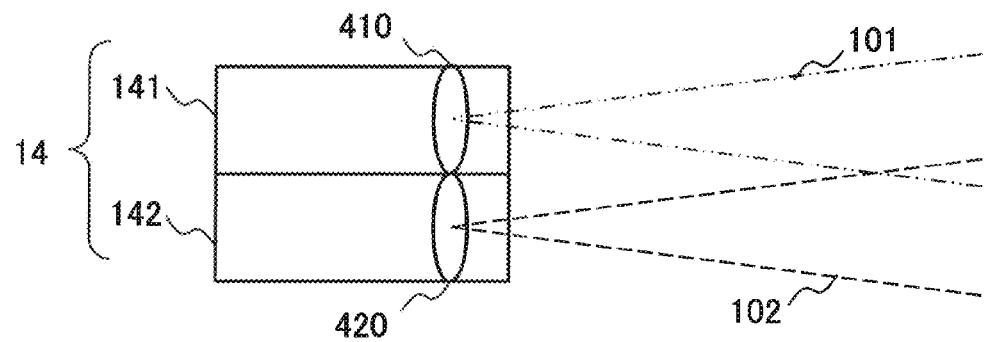
FIG. 4 is a conceptual diagram illustrating a configuration of a projection optical system included in the light emitting device in the distance measurement system according to the first example embodiment of the present invention.

FIG. 4 is a conceptual diagram illustrating a configuration example of the projection optical system 14. As illustrated in FIG. 4, the projection optical system 14 includes a long-distance projection optical system 141 (also referred to as a first optical system), and a short-distance projection optical system 142 (also referred to as a second optical system). The long-distance projection optical system 141 includes a lens 410 having a first projection angle. The short-distance projection optical system 142 includes a lens 420 having a second projection angle. Note that a shape and a size of each of the lenses 410 and 420 illustrated in FIG. 4 do not reflect an actual shape and an actual size.

The long-distance projection optical system 141 receives modulated light 130 modulated by a first pixel group of the spatial light modulator element 13, and projects long-distance projected light 101 via the lens 410. The long-distance projection optical system 141 projects long-distance projected light 101 to a far position as compared with short-distance projected light 102.

The short-distance projection optical system 142 receives modulated light 130 modulated by a second pixel group of the spatial light modulator element 13, and projects short-distance projected light 102 via the lens 420. The short-distance projection optical system 142 projects short-distance projected light 102 to a near position as compared with long-distance projected light 101.

The light source driving power supply 15 is a power supply for causing the light source 11 to emit light by driving the light source 11 in response to control of the control device 30.

The modulator element control circuit 16 causes the display part of the spatial light modulator element 13 to display a phase distribution for generating a pattern to be displayed in each projection area in response to control of the control device 30. The modulator element control circuit 16 causes a first pixel group constituting the display part of the spatial light modulator element 13 to display a phase distribution associated with long-distance projected light 101, and causes a second pixel group to display a phase distribution associated with short-distance projected light 102. For example, the modulator element control circuit 16 drives the spatial light modulator element 13 in such a way that a parameter that determines a difference between a phase of parallel light 110 to be radiated onto a display unit of the spatial light modulator element 13, and a phase of modulated light 130 to be reflected on the display unit changes.

The parameter that determines a difference between a phase of parallel light 110 to be radiated onto the display part of the phase-modulation-type spatial light modulator element 13, and a phase of modulated light 130 to be reflected on the display unit is, for example, a parameter relating to an optical characteristic such as a refractive index and a light path length. For example, the modulator element control circuit 16 changes a refractive index of the display part of the spatial light modulator element 13 by changing a voltage to be applied to the display unit. Consequently, parallel light 110 radiated onto the display unit is diffracted as necessary, based on a refractive index of the display unit. Specifically, a phase distribution of parallel light 110 radiated onto the phase-modulation-type spatial light modulator element 13 is modulated depending on an optical characteristic of the display part. Note that a method for driving the spatial light modulator element 13 by the modulator element control circuit 16 is not limited to an example described herein.

Figure 5:
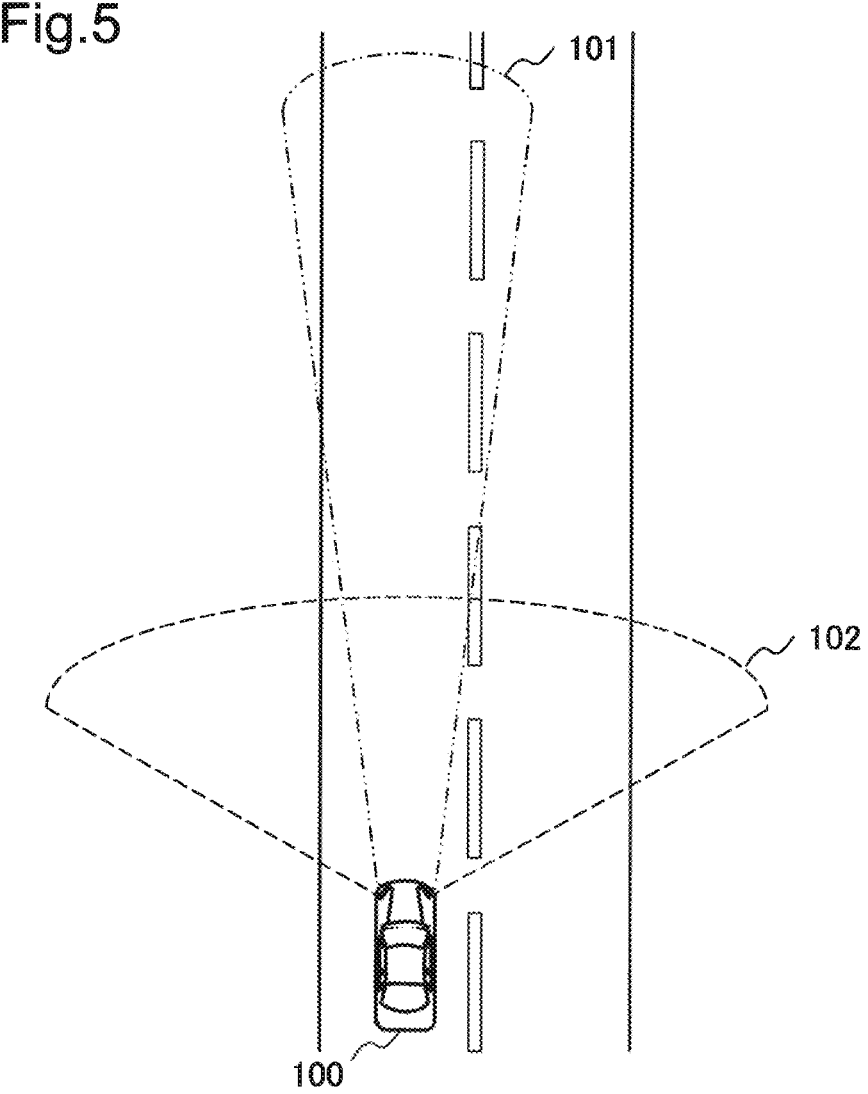
FIG. 5 is a conceptual diagram of light emission from a vehicle mounted with the distance measurement system according to the first example embodiment of the present invention.

FIG. 5 is a conceptual diagram illustrating an example in which projected light is projected from a vehicle 100 mounted with the distance measurement system 1 of the present example embodiment.

As illustrated in FIG. 5, the distance measurement system 1 mounted in the vehicle 100 projects long-distance projected light 101 to be projected to a far position and short-distance projected light 102 to be projected to a near position. The distance measurement system 1 set a projection range of short-distance projected light 102 wide, as compared with long-distance projected light 101. Generally, a wide area is needed to be seen, as a target object is closer to the vehicle 100. Therefore, the distance measurement system 1 projects light in a wider projection range, as a distance to a target object becomes shorter. Further, since the distance measurement system 1 makes a projection range of long-distance projected light 101 small, and makes spread of projected light at a far position small, resolution relating to a target object at a far position is improved, as compared with a case where projected light is projected to a far position and a near position in a same projection range.

[Light Receiving Device]

Figure 6:
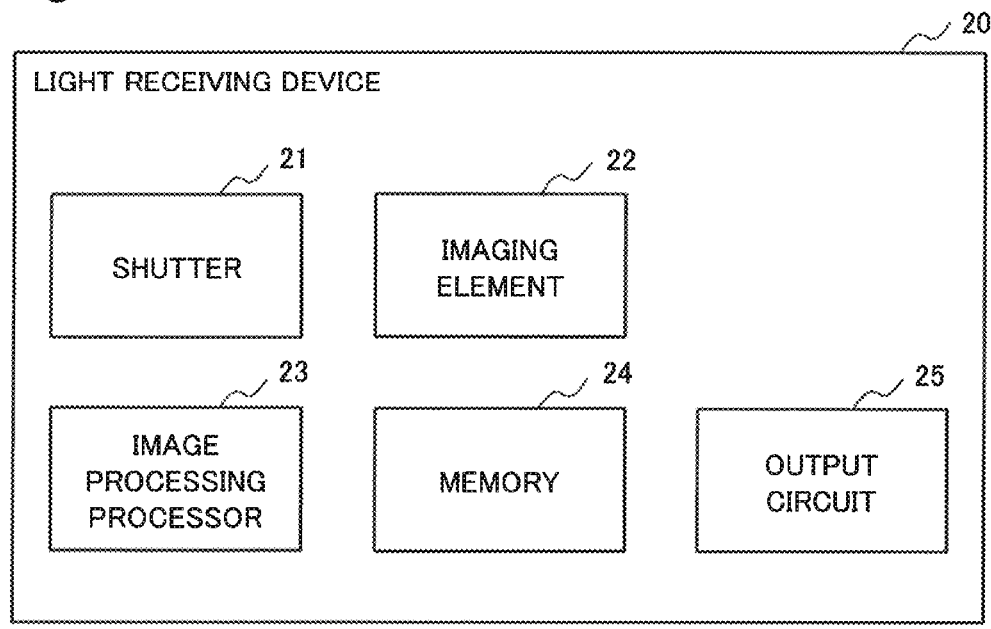
FIG. 6 is a block diagram illustrating a configuration of a light receiving device in the distance measurement system according to the first example embodiment of the present invention.

FIG. 6 is a block diagram illustrating a configuration of the light receiving device 20 in the distance measurement system 1. As illustrated in FIG. 6, the light receiving device 20 includes a shutter 21, an imaging element 22, an image processing processor 23, a memory 24, and an output circuit 25. Note that the light receiving device 20 may have a configuration different from the configuration of FIG. 6, as far as the light receiving device 20 has an imaging function of a general digital camera.

The shutter 21 is an electronic mechanism for controlling an amount of light that reaches the imaging element 22.

The imaging element 22 is an element for capturing light emitted from the light emitting device 10. The imaging element 22 is a photoelectric conversion element formed by fabricating semiconductor components into an integrated circuit, and has a structure that a plurality of light receiving areas are disposed in a grid shape. The imaging element 22 is implementable by a solid-state imaging element such as a charge-coupled device (CCD) or a complementary metal-oxide-semiconductor (CMOS), for example. A CCD or a CMOS has a plurality of light receiving areas disposed in an array. Preferably, the imaging element 22 is constituted of an element for capturing light in an infrared range. Note that the imaging element 22 may be configured to be able to capture/detect visible light other than light in an infrared range, and an electromagnetic wave such as an ultraviolet ray, an X-ray, a gamma ray, a radio wave, and a microwave, as necessary.

The image processing processor 23 is an integrated circuit for performing image processing such as dark current correction, interpolation operation, color space conversion, gamma correction, aberration correction, noise reduction, and image compression with respect to imaging data captured by the imaging element 22. Note that, when image information is not processed, the image processing processor 23 may be omitted.

The memory 24 is a storage element for temporarily storing image data that are not completely processed when image processing is performed by the image processing processor 23, and processed image data. Note that image data captured by the imaging element 22 may be configured to be temporarily stored in the memory 24. The memory 24 may be constituted of a general memory.

The output circuit 25 outputs image data processed by the image processing processor 23 to the control device 30.

[Control Device]

Figure 7:
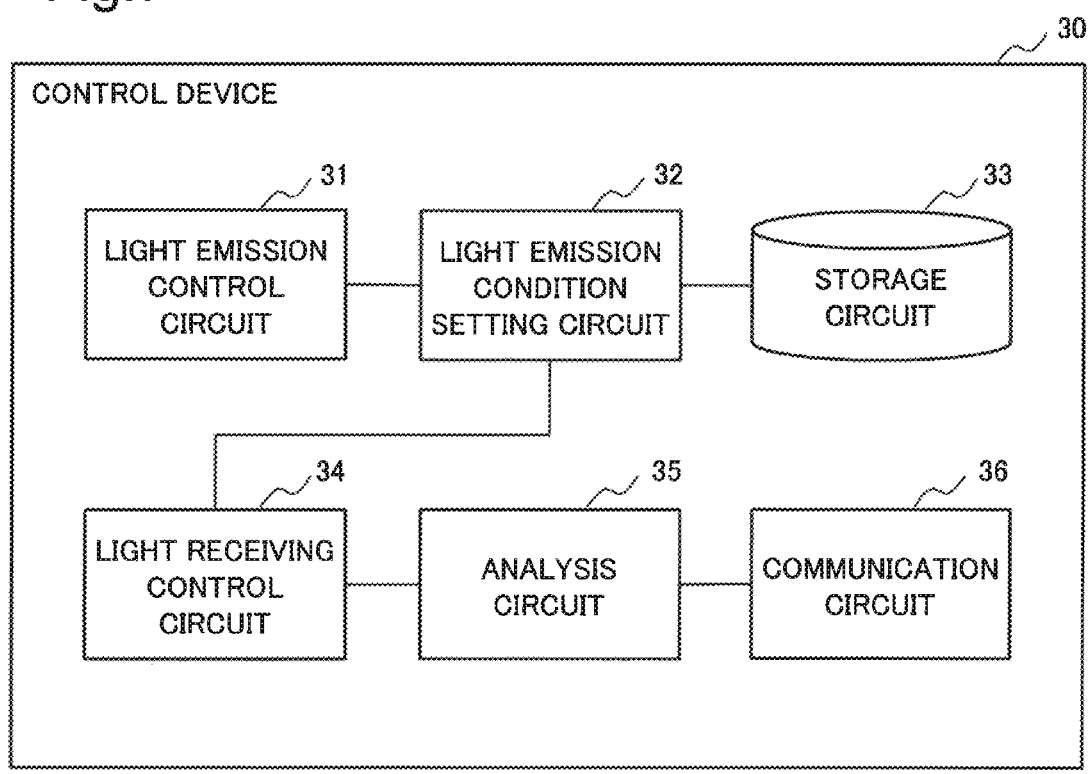
FIG. 7 is a block diagram illustrating a configuration of a control device in the distance measurement system according to the first example embodiment of the present invention.

FIG. 7 is a block diagram illustrating a configuration of the control device 30 in the distance measurement system 1.

As illustrated in FIG. 7, the control device 30 includes a light emission control circuit 31, a light emission condition setting circuit 32, a storage circuit 33, a light receiving control circuit 34, an analysis circuit 35, and a communication circuit 36.

The light emission control circuit 31 controls an ON/OFF state and a driving voltage of the light source driving power supply 15, based on a light source control condition acquired from the light emission condition setting circuit 32. By responding to control of the light emission control circuit 31, the light source driving power supply 15 is able to project a pattern to be generated by a phase distribution displayed on the display part of the spatial light modulator element 13 onto each projection area at a desired timing.

Further, the light emission control circuit 31 controls the modulator element control circuit 16 in such a way as to display a phase distribution for generating a pattern to be formed in each projection area on each pixel constituting the display part of the spatial light modulator element 13. The light emission control circuit 31 controls the modulator element control circuit 16 in such a way as to display a phase distribution associated with a display pattern of long-distance projected light 101 on a first pixel group constituting the display part of the spatial light modulator element 13. Further, the light emission control circuit 31 controls the modulator element control circuit 16 in such a way as to display a phase distribution associated with a display pattern of short-distance projected light 102 on a second pixel group constituting the display part of the spatial light modulator element 13. For example, the light emission control circuit 31 drives the spatial light modulator element 13 in such a way that a parameter that determines a difference between a phase of parallel light 110 to be radiated onto the display part of the spatial light modulator element 13, and a phase of modulated light 130 to be reflected on the display part changes.

The light emission condition setting circuit 32 acquires, from the storage circuit 33, a phase distribution of a basic pattern constituting a pattern to be projected onto each projection area. The light emission condition setting circuit 32 generates a phase distribution to be displayed on the display part of the spatial light modulator element 13 by performing motion processing or combining processing with respect to a phase distribution of a basic pattern stored in the storage circuit 33.

Further, the light emission condition setting circuit 32 generates a control condition for emitting projected light for appropriate display-information toward an appropriate display area at an appropriate timing. A control condition includes a modulator element control condition for emitting projected light that forms an appropriate pattern onto an appropriate projection area, and a light source control condition for emitting projected light at an appropriate timing. The light emission condition setting circuit 32 outputs the modulator element control condition to the light emission control circuit 31, and outputs the light source control condition to the light emission control circuit 31.

The storage circuit 33 stores a phase distribution of a basic pattern constituting a projection pattern to be projected onto each projection area. For example, the storage circuit 33 may store in advance a phase distribution of a basic pattern for generating a projection pattern. Note that the storage circuit 33 may store not only a phase distribution of a basic pattern, but also a phase distribution of a pattern being a combination of basic patterns, and a phase distribution of a further complicated pattern.

The light receiving control circuit 34 controls the light receiving device 20 in such a way as to capture each projection area, based on a light source control condition set by the light emission condition setting circuit 32. Note that, when the shutter 21 is not set in the light receiving device 20, the light receiving control circuit 34 does not perform control of opening and closing the shutter 21.

The light receiving control circuit 34 opens the shutter 21 at a timing for capturing a projected pattern, and causes the imaging element 22 to capture each projection area. Specifically, the light receiving control circuit 34 controls to open the shutter 21 at a timing when reflected light of long-distance projected light 101 and short-distance projected light 102 is received, and controls to close the shutter 21 during a period when no reflected light of projected light is received.

The light receiving control circuit 34 acquires imaging data captured by the light receiving device 20. The light receiving control circuit 34 outputs captured imaging data to the analysis circuit 35.

The analysis circuit 35 analyzes a pattern included in imaging data received from the light receiving control circuit 34, and verifies presence or absence of a target object in a light projection area of long-distance projected light 101 and short-distance projected light 102. When the analysis circuit 35 determines that a target object is present in a light projection area of long-distance projected light 101 or short-distance projected light 102, the analysis circuit 35 measures a distance to the target object in a light projection area where the target object is determined to be present. For example, the analysis circuit 35 is able to recognize up to a shape of a target object depending on a type of a pattern to be projected from long-distance projected light 101 and short-distance projected light 102.

The analysis circuit 35 outputs, to the communication circuit 36, information including presence or absence of a target object in a light projection area of long-distance projected light 101 and short-distance projected light 102, a distance to a target object, and the like.

The communication circuit 36 is an interface for connecting another system, another device, another sensor, and the like; and the distance measurement system 1. The communication circuit 36 transmits, to another system, another device, another sensor, and the like, information acquired by the distance measurement system 1. Further, the communication circuit 36 may receive, from another system, another device, another sensor, and the like, a signal including an instruction and a request to the distance measurement system 1. A communication pattern of the communication circuit 36 may be wired communication, or may be wireless communication. A frequency band, a communication quality, a standard, and the like of the communication circuit 36 are not specifically limited.

[Hardware]

Figure 8:
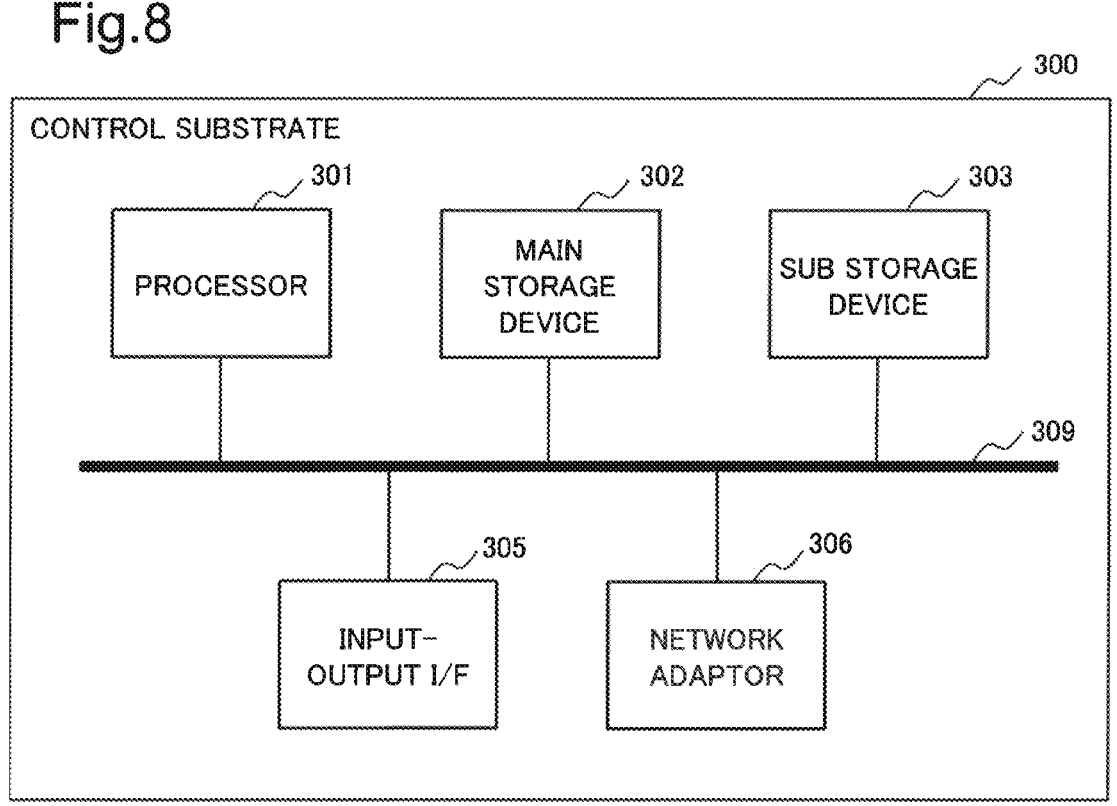
FIG. 8 is a block diagram illustrating a configuration of a control substrate for implementing a control system in the distance measurement system according to the first example embodiment of the present invention.

Herein, a hardware (control substrate 300) for implementing a control system of the distance measurement system 1 according to the present example embodiment is described using FIG. 8. Note that the control substrate 300 in FIG. 8 is an example for implementing the distance measurement system 1, and does not limit the scope of the present invention.

As illustrated in FIG. 8, the control substrate 300 includes a processor 301, a main storage device 302, a sub storage device 303, an input-output interface 305, and a network adaptor 306. Note that, in FIG. 8, an interface is abbreviated as an I/F. The processor 301, the main storage device 302, the sub storage device 303, the input-output interface 305, and the network adaptor 306 are connected to one another via a bus 309. Further, the processor 301, the main storage device 302, the sub storage device 303, and the input-output interface 305 are connected to a network such as an intranet or the Internet via the network adaptor 306. The control substrate 300 is connected to an unillustrated another system, device, sensor, or the like via a network. Further, the control substrate 300 may be connected to a host system or a server via a network.

The processor 301 is a central processing unit that expands a program stored in the sub storage device 303 or the like in the main storage device 302, and executes the expanded program. In the present example embodiment, the processor 301 may be configured to employ a software program installed in the control substrate 300. The processor 301 performs arithmetic processing and control processing by the control device 30.

The main storage device 302 has an area where a program is expanded. The main storage device 302 may be a volatile memory such as a dynamic random access memory (DRAM), for example. Further, a non-volatile memory such as a magnetoresistive random access memory (MRAM) may be configured/added as the main storage device 302.

The sub storage device 303 is a means for storing data such as a phase distribution to be displayed on a display part of the spatial light modulator element 13. The sub storage device 303 is configured as a local disk such as a hard disk or a flash memory. Note that the sub storage device 303 may be omitted by configuring that data are stored in the main storage device 302.

The input-output interface 305 is a device for connecting between the control substrate 300 and peripheral equipment, based on a connection standard.

The control substrate 300 may be configured to be connectable to input equipment such as a keyboard, a mouse, and a touch panel, as necessary. These pieces of input equipment are employed for input of information and settings. Note that, when a touch panel is employed as input equipment, a touch panel such that a display screen of display equipment also serves as an interface of input equipment may be employed as input equipment. Data transmission and reception between the processor 301 and input equipment may be mediated via the input-output interface 305.

The network adaptor 306 is an interface for connection to a network such as the Internet or an intranet, based on a standard or a specification. The input-output interface 305 and the network adaptor 306 may be standardized as an interface to be connected to external equipment.

The foregoing is an example of a hardware configuration that enables the distance measurement system 1 of the present example embodiment. Note that a hardware configuration of FIG. 8 is an example of a hardware configuration for enabling the distance measurement system 1 of the present example embodiment, and does not limit the scope of the present invention. Further, a distance measurement program that causes a computer to execute processing relating to the distance measurement system 1 of the present example embodiment is also included in the scope of the present invention. Furthermore, a program recording medium recorded with a distance measurement program according to the present example embodiment is also included in the scope of the present invention.

Figure 9:
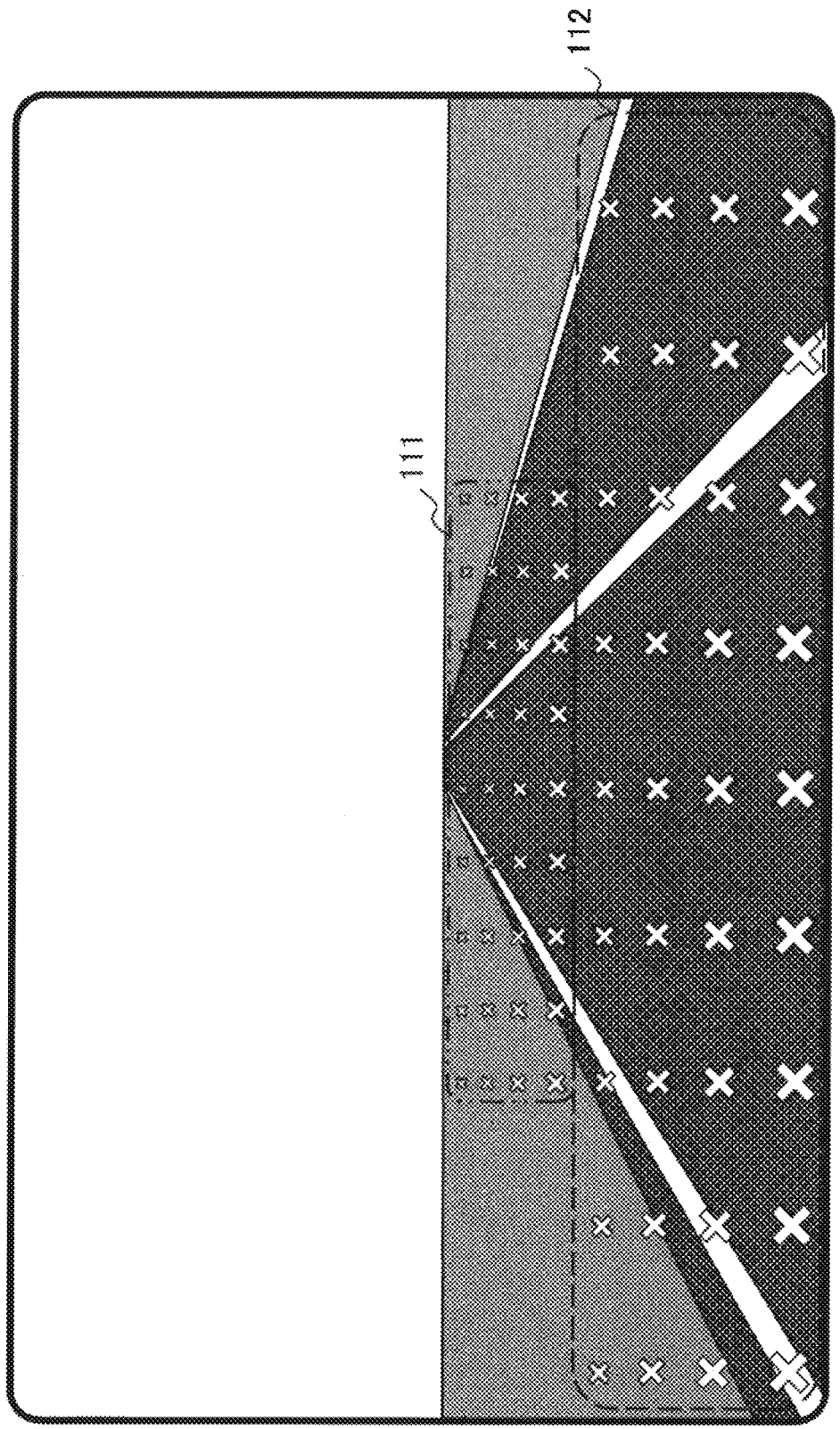
FIG. 9 is a conceptual diagram illustrating an example of a pattern to be formed by projected light from the distance measurement system according to the first example embodiment of the present invention.

FIG. 9 is a conceptual diagram illustrating an example of a pattern to be formed by projected light from the distance measurement system 1. FIG. 9 is an example in which a pattern constituted of elements (points) aligned in a grid shape is projected onto a road viewed through a windshield of a vehicle.

In the example of FIG. 9, long-distance projected light 101 is projected onto a first projection area 111 on a side far from a vehicle, and short-distance projected light 102 is projected onto a second projection area 112 on a side near the vehicle. As illustrated in FIG. 9, when a same pattern is projected onto the first projection area 111 and the second projection area 112 from the light project device 10, a projection range of first projected light to be projected to a far position is made small. Therefore, the light receiving device 20 acquires an image as if points constituting a pattern projected onto the first projection area 111 are aligned at narrow intervals.

Generally, a target object located at a far distance looks small. Therefore, when a same pattern is projected to a near position and a far position, an interval between elements constituting a far pattern increases, and resolution may be lowered. On the other hand, as illustrated in FIG. 9, when a projection range of first projected light to be projected to a far position is made small, as compared with a projection range of second projected light to be projected to a near position, an interval of elements constituting a pattern to be projected onto the first projection area 111 at a far position becomes small. Therefore, resolution sufficient for detecting a target object located in the second projection area 112 is acquired.

Figure 10:
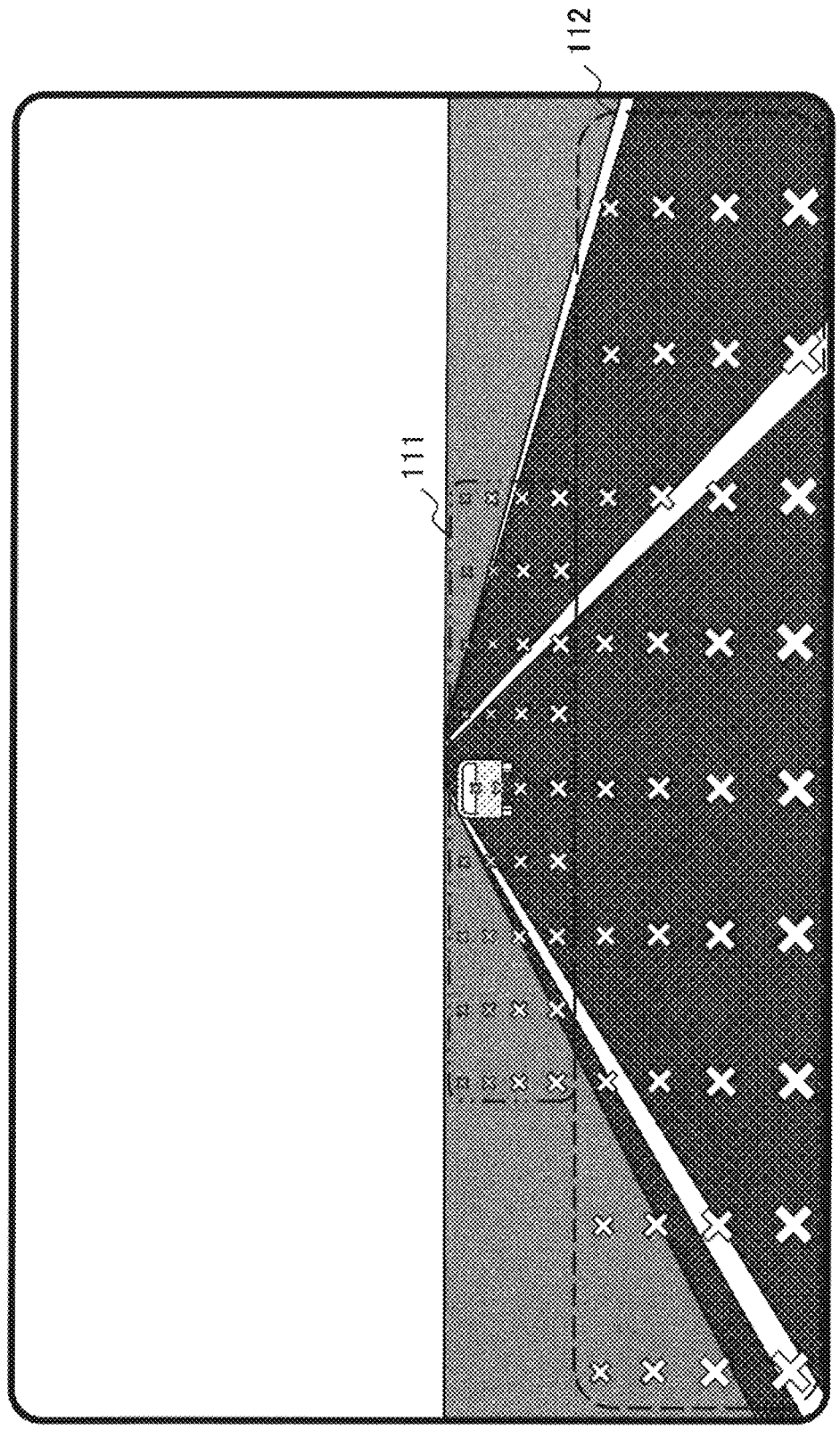
FIG. 10 is a conceptual diagram illustrating an example of a pattern to be formed by projected light from the distance measurement system according to the first example embodiment of the present invention.

FIG. 10 is an example in which a vehicle (target object) is located on a road (first projection area 111). Deviation occurs in a point projected to a position of a target object among points constituting a pattern projected onto the first projection area 111.

Specifically, firstly, a target object is detected within a measurement range of the distance measurement system 1 by detecting a deviation of an element constituting a captured pattern. Then, secondly, the distance measurement system 1 is able to measure a distance to the target object by an amount of deviation of the element constituting the captured pattern. For example, the distance measurement system 1 measures a distance to a detected target object by employing a principle of triangulation.

Figure 11:
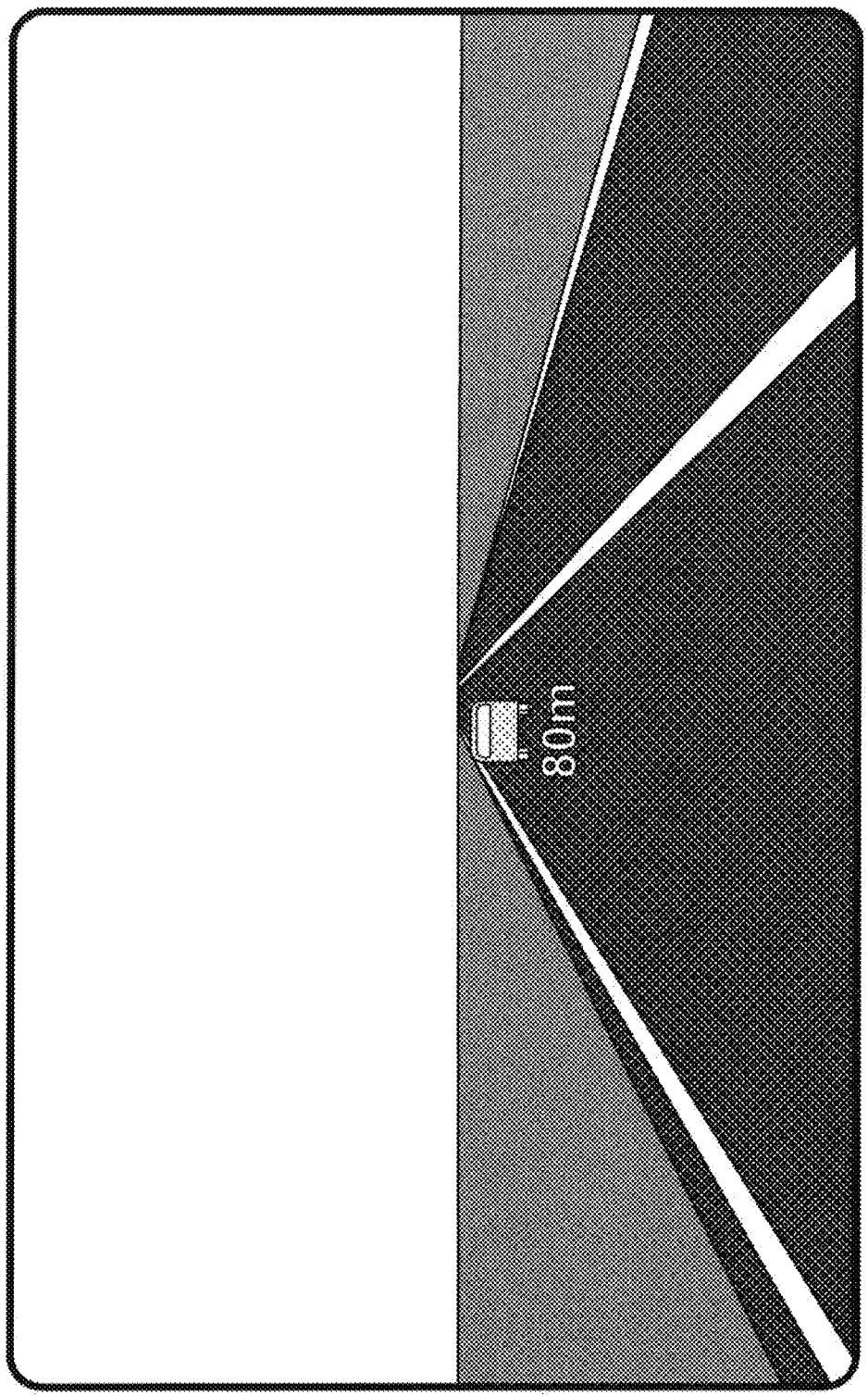
FIG. 11 is a conceptual diagram illustrating an example in which an analysis result by the distance measurement system according to the first example embodiment of the present invention is caused to be displayed on a display device.

FIG. 11 is an example in which a distance to a measured target object is displayed near the target object. For example, as long as a vehicle mounted with the distance measurement system 1 includes a camera for capturing a front area, and a video captured by the camera is displayable on a monitor within the vehicle, it is only needed to display a measured distance on the monitor. Further, a distance to a target object may be displayed at a position near the target object viewable through a front window of a vehicle mounted with the distance measurement system 1 by employing a system capable of displaying an image on the front window.

Figure 12:
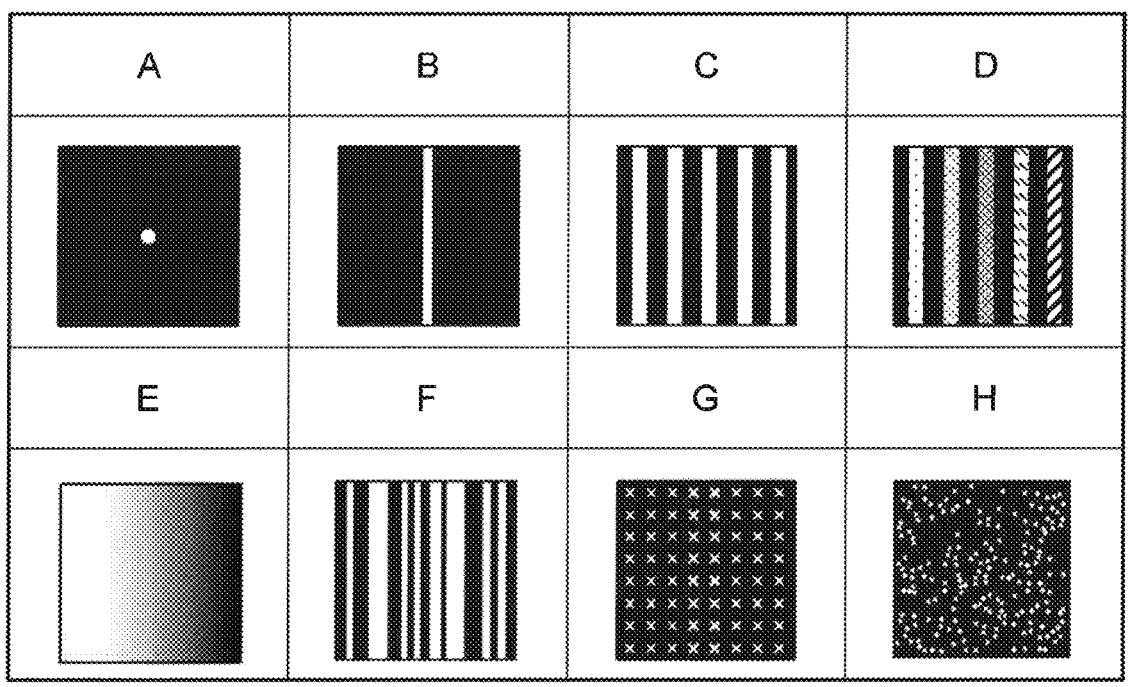
FIG. 12 is an exemplified list of patterns to be formed by projected light from the distance measurement system according to the first example embodiment of the present invention.

FIG. 12 is an exemplified list of patterns to be formed by projected light to be projected onto a projection area. For example, the distance measurement system 1 performs target object detection and distance measurement by an active measurement method.

A is an example in which a pattern of a spot shape (spot light) is projected.

When spot light is used, the control device 30 calculates a distance to a target by a triangulation principle. Generally, when a target object is detected from a moving object such as a vehicle, it is necessary to scan spot light two-dimensionally. Since high resolution is not required when only presence of a target object is detected, a long time is not required for recording/analyzing a reflected image of spot light. However, when a high resolution that enables to clarify a shape of a target object is required, a sufficiently long time is required for recording/analyzing a reflected image of spot light, and an amount of data becomes enormous. Therefore, a triangulation principle is not appropriate for the purpose of instantaneously determining a target object. When spot light is used, it may be appropriate to employ an algorithm that enables to output a signal indicating that a target object is detected at a stage when the target object at a position nearer than a predetermined distance is detected.

B is an example in which a pattern of a line shape (slit light) is projected. Note that slit light may not be vertical but may be horizontal.

When slit light is used, it is possible to measure a distance to a target object by a light-section method to which triangulation is applied. When slit light is used, since the light receiving device 20 is only needed to one-dimensionally scan sheet-shaped light, it is possible to acquire high-resolution three-dimensional information at a high speed, as compared with a case where spot light is used. When slit light is used, since imaging processing by the light receiving device 20 determines an entire processing speed, it is preferable to design an element in such a way as to speed up signal processing. Note that, when slit light is used, it is preferable to increase a frame rate of the imaging element 22 for increasing resolution of three-dimensional information. It is necessary to increase a light intensity of projected light in order to reduce an exposure time per frame. When a human is included in a target object, however, an intensity of laser light to be projected has an upper limit. Therefore, a limit may occur in resolution.

C is an example in which a stripe-shaped pattern (stripe light) is projected. Note that a stripe-shaped pattern may not have vertical stripes but may have horizontal stripes.

When stripe light is used, since a plurality of line-shaped patterns are simultaneously projected, it is possible to reduce a number of times of light emission and light reception. Therefore, it is possible to speed up three-dimensional information measurement, as compared with a case where one line-shaped slit light is projected. Further, when stripe light is used, it is possible to detect a target object depending on a degree of distortion of a plurality of lines. Therefore, it is also possible to detect presence or absence of a target object by one-time light emission/light reception. When it is necessary to recognize up to a shape of a target object, analysis may be performed by scanning a pattern in a direction perpendicular to a line, and receiving reflected light from the pattern.

D is an example in which a pattern including lines of a plurality of colors is projected in the case of C. Note that a stripe-shaped pattern may not have vertical stripes, but may have horizontal stripes.

When stripe light of a plurality of colors is used, the control device 30 is able to analyze each line independently in association with a color. Therefore, it is possible to process information acquired for each projected area in association with each color.

E is an example in which a gradation pattern (oblique light) in which a density smoothly changes is projected. Note that a density of oblique light does not increase from left to right, but may increase from right to left. Further, a density of oblique light does not change in a left-right direction, but may change in an up-down direction, change in an oblique direction, or change radially from a center. Further, oblique light is not composed of a gradation of a single color, but may be composed of gradations of a plurality of colors.

When oblique light is used, causing the control device 30 to analyze an intensity distribution of received reflected light enables to detect presence or absence of a target object, measure a distance to a target object, and recognize a shape of a target object.

F is an example in which a coded pattern (coded light) is projected.

When coded light is used, it is possible to measure three-dimensional information of a target object by one-time light emission/light reception, similarly to a case where stripe light is used. Further, when coded light is used, it is possible to measure an absolute distance to a target object. However, since image processing of a large amount of calculation is required when a code is decoded, or it may be difficult to measure up to a fine part of a target object, it is not always a case that arithmetic processing in the control device 30 is sped up.

G is an example in which elements aligned in an array (pattern light) are projected.

When pattern light is used, reflected light from a target object distorts among reflected light from an area including the target object, as compared with reflected light from a portion where the target object is not included. Therefore, it is possible to acquire distance information including a shape of a target object by comparing a pattern to be received in a condition that the target object is not present, and a pattern of received reflected light in a condition that the target object is present. A pattern to be received in a condition that a target object is not present may be stored as a pattern for calibration when a system is started up, or a pattern acquired each time light is received may be successively stored. Note that G in FIG. 12 illustrates an example in which pattern light constituted of x-marked elements is projected. Resolution and the like of acquired three-dimensional information differ depending on a shape of a mark constituting pattern light. Therefore, it is preferable to select a mark constituting a pattern depending on required three-dimensional information. Note that pattern light may be constituted of elements of a single type, or may be constituted by combining elements of a plurality of types.

H is an example in which a random pattern (random pattern light) is projected.

Also when random pattern light is used, similarly to a case where pattern light is used, it is possible to acquire distance information including a shape of a target object by comparing a pattern to be received in a condition that the target object is not present, and a pattern of received reflected light in a condition that the target object is present. Using random pattern light enables to recognize up to a fine part of a target object by a change in local pattern. When random pattern light is used, it is possible to discriminate up to a fine part of a target object. On the other hand, when a fine change is recognized in a detection area, an amount of processing by the control device 30 becomes enormous. Therefore, it is preferable to employ an algorithm that distinguishes a process of detecting a large change in displacement amount for detecting a target object, and a process of detecting even a small change in displacement amount in an area including a detected target object.

Figure 13:
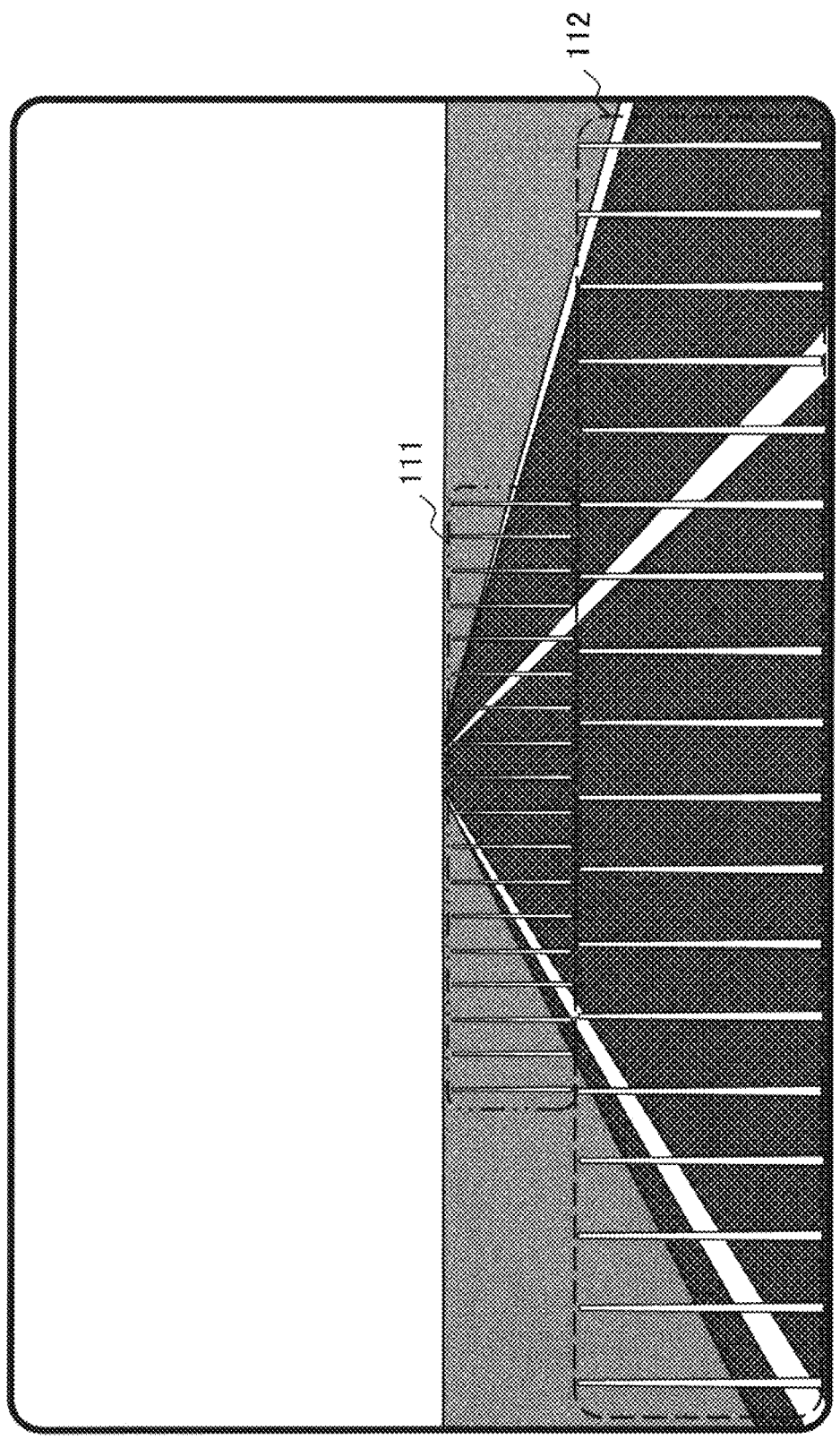
FIG. 13 is a conceptual diagram illustrating another example of a pattern to be formed by projected light from the distance measurement system according to the first example embodiment of the present invention.

FIG. 13 is an example in which stripe light in which a plurality of lines are aligned is projected onto a first projection area 111 and a second projection area 112, in place of pattern light to be projected in FIG. 10. Also in the example of FIG. 13, it is possible to measure a distance to a target object, based on a change in projected pattern.

[Operation]

Figure 14:
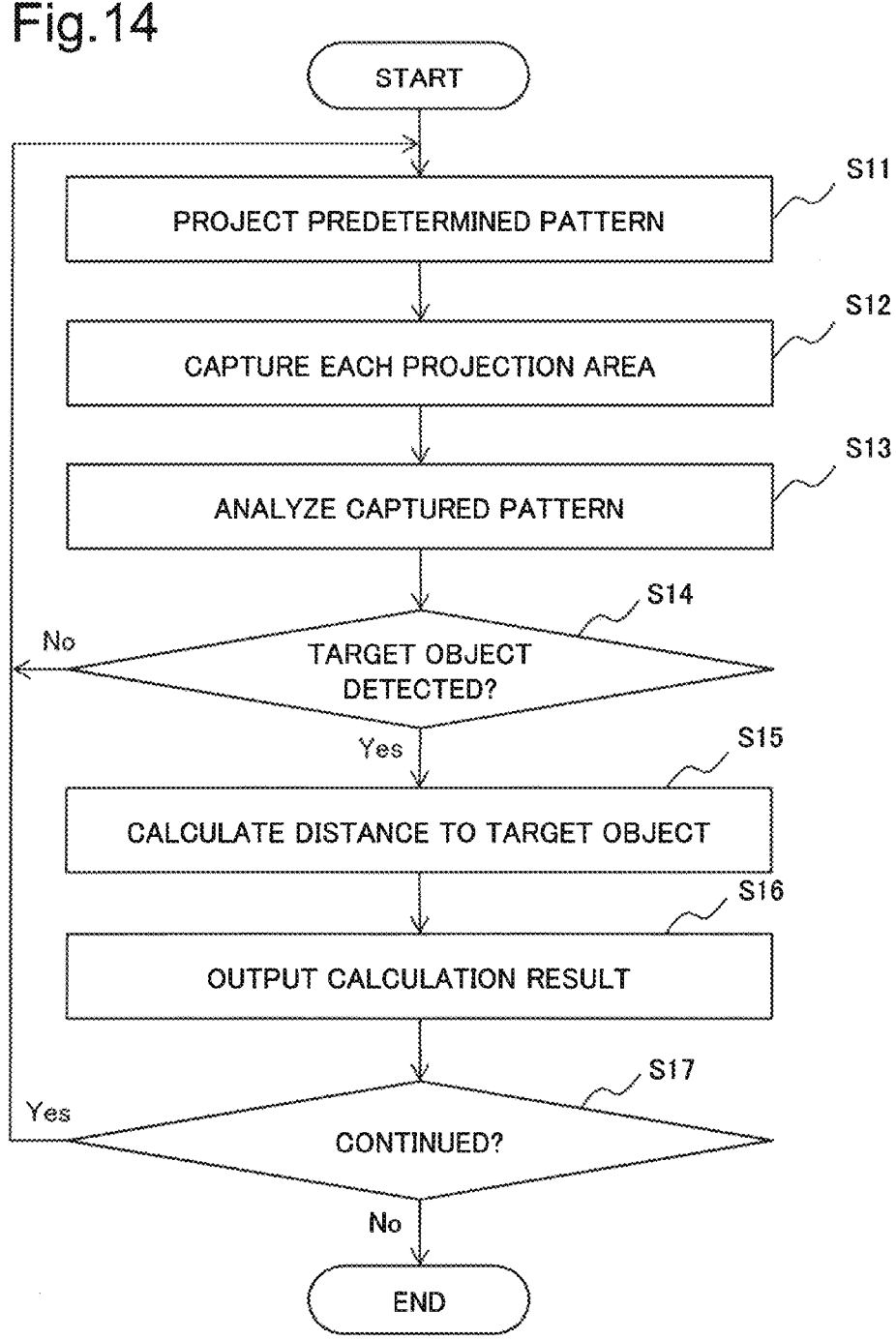
FIG. 14 is a flowchart illustrating an operation example of the distance measurement system according to the first example embodiment of the present invention.

Next, an operation example of the distance measurement system 1 of the present example embodiment is described using a flowchart of FIG. 14. FIG. 14 is a flowchart in a case where long-distance projected light 101 and short-distance projected light 102 are simultaneously projected. Note that, in the following description, only an overview of an operation is described, and details on data transmission and reception among constituent elements and the operation are omitted.

First, in FIG. 14, the light emitting device 10 emits a predetermined pattern toward a first projection area and a second projection area (Step S11).

The light receiving device 20 captures the first projection area and the second projection area (Step S12).

The control device 30 analyzes a pattern captured by the light receiving device 20 (Step S13).

When the control device 30 does not detect a target object (No in Step S14), the operation returns to Step S11.

When the control device 30 detects a target object (Yes in Step S14), the control device 30 calculates a distance to the target object (Step S15).

The control device 30 outputs the calculated distance to the target object (Step S16).

When light emission from the light emitting device 10 is continued (Yes in Step S17), the operation returns to Step S11. On the other hand, when light emission from the light emitting device 10 is finished (No in Step S17), a process in accordance with the flowchart of FIG. 14 is finished.

The foregoing is description about the operation example of the distance measurement system 1 of the present example embodiment.

(Comparative Example)

Figure 15:
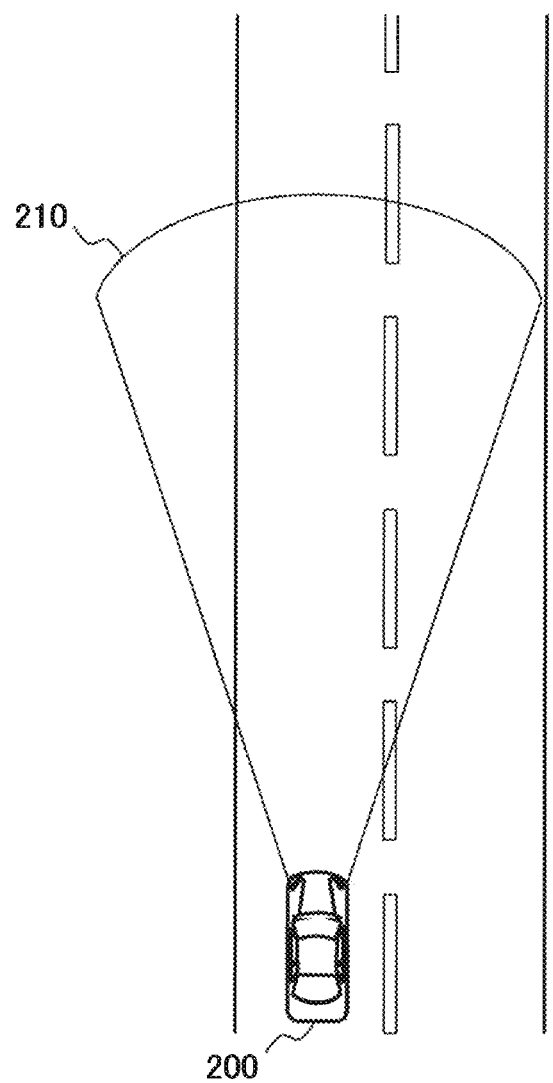
FIG. 15 is a conceptual diagram of light emission by a vehicle mounted with a general distance measurement system.

Herein, a comparative example in which target object detection/distance measurement is performed without dividing a projection area in terms of a distance is described using FIG. 15. In the comparative example of FIG. 15, since all distances are associated by projected light 210 of a single pattern, an area far from a vehicle 200, and an area near the vehicle 200 are not distinguished.

In a case of a vehicle, as compared with a target object at a far distance, it is needed to detect a target object near the vehicle faster and more accurately. This is because the closer a target object such as a human and a car is to a vehicle, a risk of collision increases. It is preferable to set a range to be monitored from the vehicle 200 to a wide angle, as a target object is closer to the vehicle 200. However, when a projection range is increased in order to monitor a position near the vehicle 200, not only resolution at a short distance becomes small, but also resolution with respect to a target object at a far distance is considerably lowered.

Figure 16:
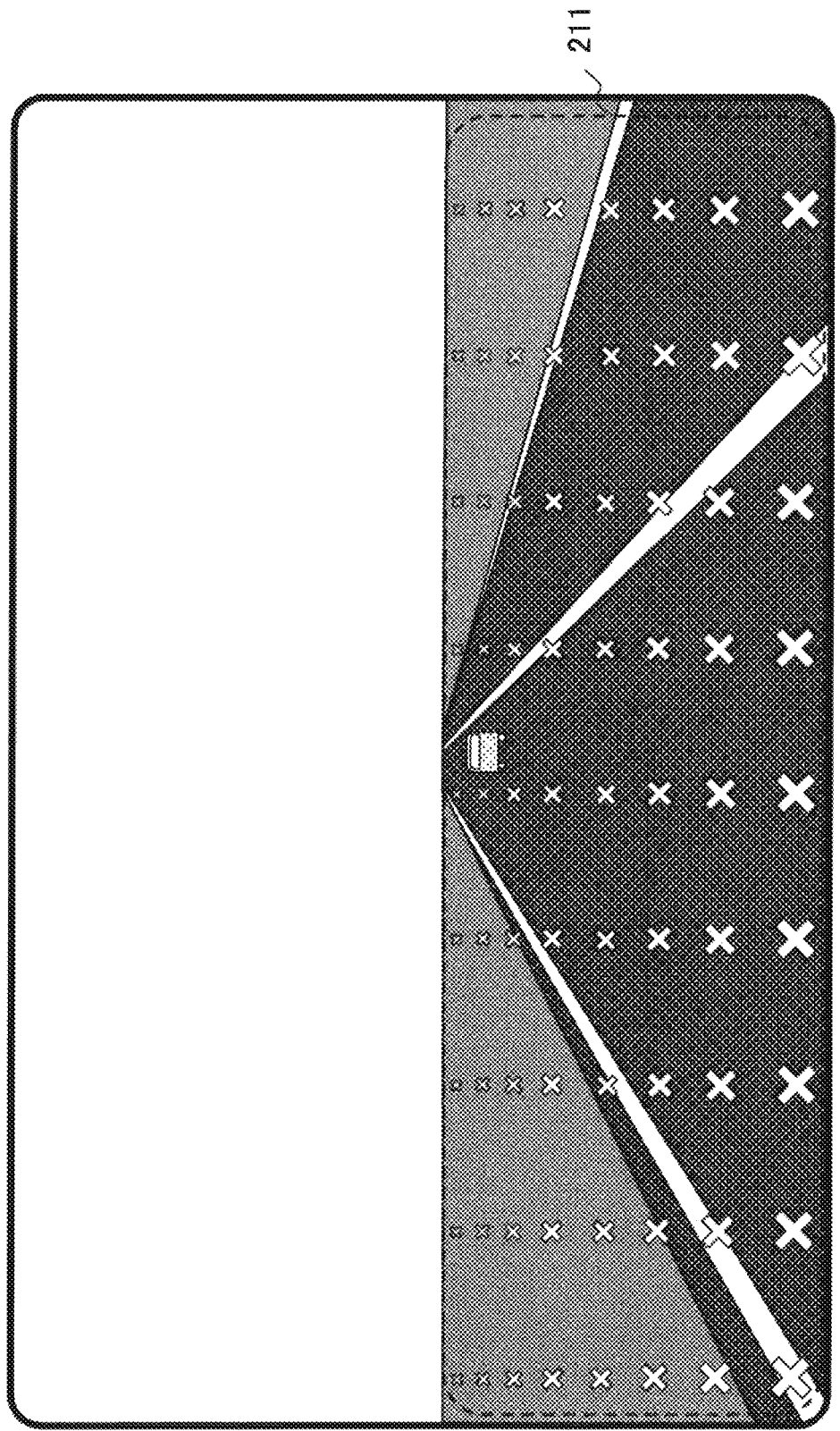
FIG. 16 is a conceptual diagram illustrating an example of a pattern to be emitted by a general light emitting device.

FIG. 16 illustrates that a vehicle is not detected, since the vehicle is located in a gap between elements constituting a pattern, when the vehicle at a far distance is tried to be detected by the system of FIG. 15. Specifically, there is an issue that, when verification is performed without distinguishing far and near, as illustrated in FIG. 16, it may be impossible to detect a target object at a far distance, or detection may be delayed.

On the other hand, in the present example embodiment, when a target object is detected, verification is performed by distinguishing far and near. Specifically, in the present example embodiment, when a short distance is monitored, a projection range is made large, and when a long distance is monitored, projected light is made small.

In order to change a projection range at each distance in a general projector, a plurality of light sources are required, as exemplified in PTL 1 (Japanese Unexamined Patent Application Publication No. S59-198377). On the other hand, in the present example embodiment, since a phase-modulation-type spatial light modulator element is employed, it is possible to project light in a plurality of projection ranges by a single light source. Further, since a spatial light modulator element to be used in a distance measurement system of the present example embodiment is focus free, focus adjustment is not necessary.

As described above, since a distance measurement system of the present example embodiment is able to set an image to be displayed on a display part of the spatial light modulator element 13 at any position, it is possible to project any pattern without using a slit or the like. A pattern to be projected may be of a single type, or patterns of a plurality of types may be combined. Note that a method to be used for detecting a target object is not limited to the above-described methods. Further, since the distance measurement system 1 of the present example embodiment is able to project any pattern, the distance measurement system 1 is applicable not only to distance measurement, but also to various position detection methods.

In a distance measurement system of the present example embodiment, since it is possible to concentratedly project light onto a display portion by a phase-modulation-type spatial light modulator element, power efficiency is high, as compared with a general projector which uniformly projects light onto a light projection area.

(Second Example Embodiment)

Next, a configuration of a distance measurement system according to a second example embodiment of the present invention is described with reference to the drawings. In the present example embodiment, unlike the first example embodiment, light is projected in association with three distances.

Figure 17:
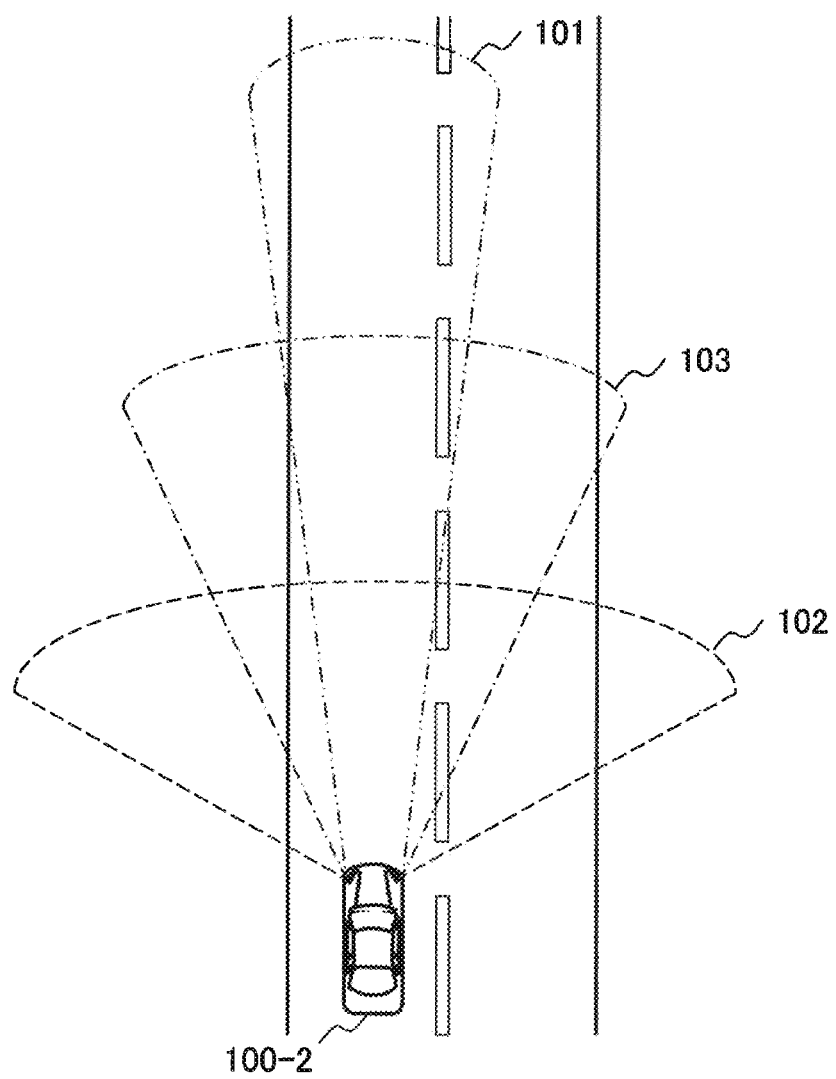
FIG. 17 is a conceptual diagram of light emission by a vehicle mounted with a distance measurement system according to a second example embodiment of the present invention.
Figure 18:
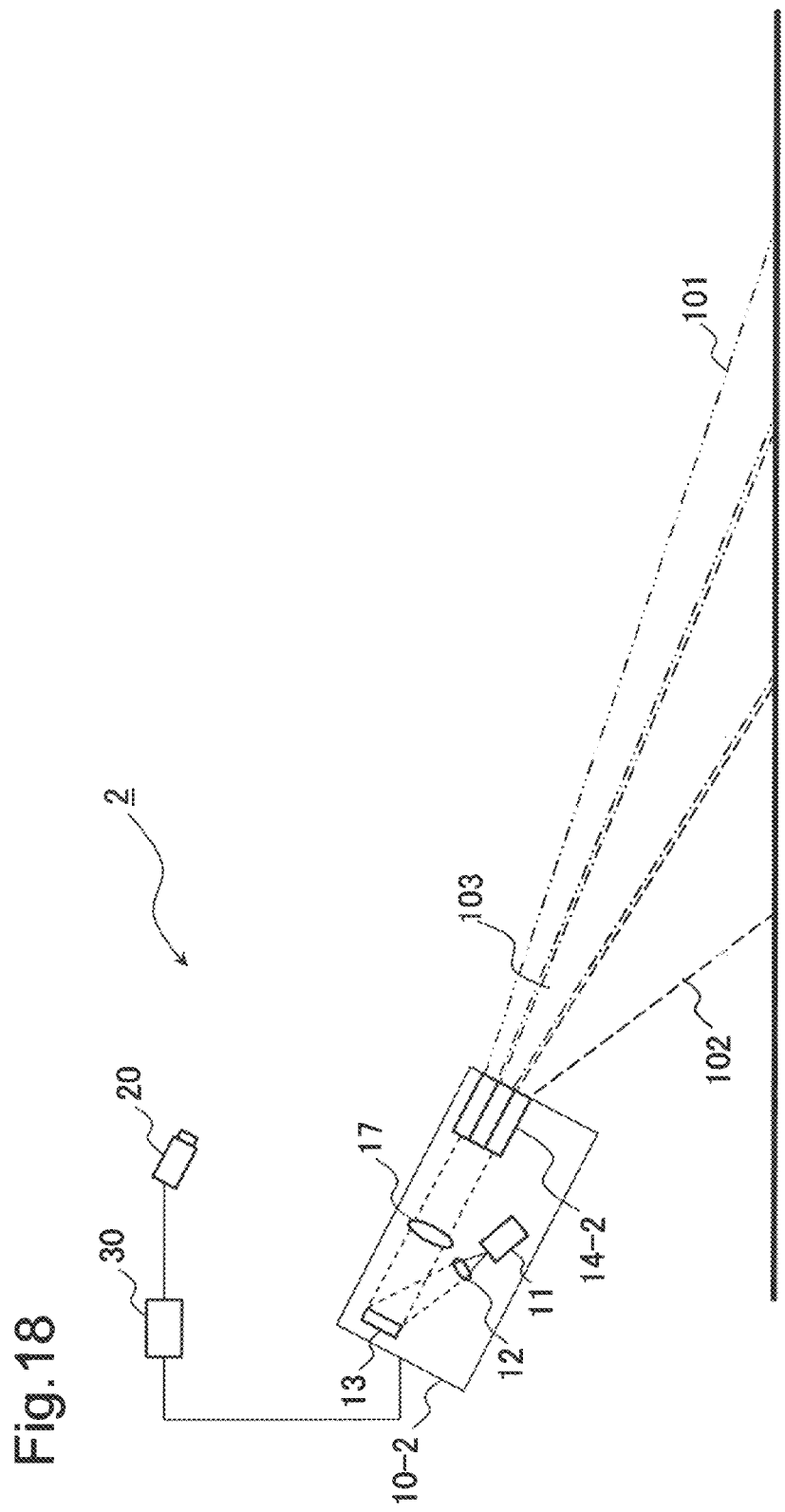
FIG. 18 is a conceptual diagram illustrating a configuration of the distance measurement system according to the second example embodiment of the present invention.

FIG. 17 is a conceptual diagram illustrating an example in which projected light is projected from a vehicle 100-2 mounted with a distance measurement system 2 of the present example embodiment. FIG. 18 is a conceptual diagram illustrating a configuration of the distance measurement system 2.

As illustrated in FIG. 17, the distance measurement system 2 projects middle-distance projected light 103 (third projected light) to a position at a middle distance (third distance) being an intermediate distance between a long distance (first distance) and a short distance (second distance), in addition to long-distance projected light 101 and short-distance projected light 102. A projection area to be set at a third distance is also referred to as a third projection area. A projection range of middle-distance projected light 103 is set to be larger than a projection range of long-distance projected light 101, and smaller than a projection range of short-distance projected light 102.

As illustrated in FIG. 18, the distance measurement system 2 includes a light emitting device 10-2 having a projection optical system (projection optical system 14-2), which is different from the light emitting device 10 in the first example embodiment.

Figure 19:
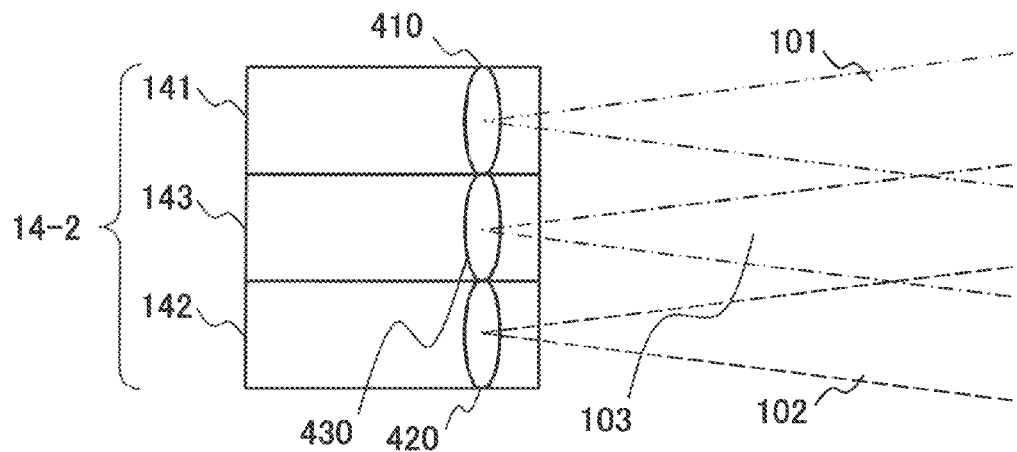
FIG. 19 is a conceptual diagram illustrating a configuration of a projection optical system included in a light emitting device in the distance measurement system according to the second example embodiment of the present invention.

FIG. 19 is a conceptual diagram illustrating a configuration example of the projection optical system 14-2. As illustrated in FIG. 19, the projection optical system 14-2 includes a middle-distance projection optical system 143 (third optical system) for projecting at a third projection angle, in addition to a long-distance projection optical system 141 and a short-distance projection optical system 142.

The long-distance projection optical system 141 includes a lens 410 having a first projection angle. The short-distance projection optical system 142 includes a lens 420 having a second projection angle. The middle-distance projection optical system 143 includes a lens 430 having a third projection angle. Note that a shape and a size of each of the lenses 410, 420, and 430 illustrated in FIG. 19 do not reflect an actual shape and an actual size. Further, each of the lenses 410, 420, and 430 may be constituted of a plurality of lenses.

The long-distance projection optical system 141 projects a part of incident modulated light 130 at a first projection angle. Light projected from the long-distance projection optical system 141 is long-distance projected light 101. The long-distance projection optical system 141 projects long-distance projected light 101 to a position farther than short-distance projected light 102 and middle-distance projected light 103.

The short-distance projection optical system 142 projects a part of incident modulated light 130 at a second projection angle. Light projected from the short-distance projection optical system 142 is short-distance projected light 102. The short-distance projection optical system 142 projects short-distance projected light 102 to a position nearer than long-distance projected light 101 and middle-distance projected light 103.

The middle-distance projection optical system 143 projects a part of incident modulated light 130 at a third projection angle. Light projected from the middle-distance projection optical system 143 is middle-distance projected light 103. The middle-distance projection optical system 143 projects middle-distance projected light 103 to a position farther than short-distance projected light 102 and nearer than long-distance projected light 101.

Parallel light 110 reflected by a first pixel group for long-distance projected light is guided to the long-distance projection optical system 141. Light guided to the long-distance projection optical system 141 is projected to a far position at a first projection angle by the lens 410.

Parallel light 110 reflected by a second pixel group for short-distance projected light is guided to the short-distance projection optical system 142. Light guided to the short-distance projection optical system 142 is projected to a near position at a second projection angle by the lens 420.

Parallel light 110 reflected by a third pixel group for middle-distance projected light is guided to the middle-distance projection optical system 143. Light guided to the middle-distance projection optical system 143 is projected to a position between a far position and a near position at a third projection angle by the lens 430.

Figure 20:
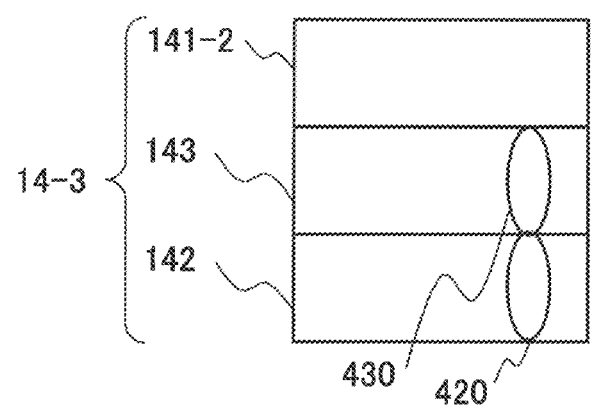
FIG. 20 is a conceptual diagram illustrating another configuration of the projection optical system included in the light emitting device in the distance measurement system according to the second example embodiment of the present invention.

FIG. 20 is a conceptual diagram illustrating a modification example (projection optical system 14-3) of the projection optical system 14-2. As illustrated in FIG. 20, the projection optical system 14-3 includes a long-distance projection optical system 141-2 without a projection lens. When projected light is projected onto a predetermined projection area of a Fraunhofer region, modulated light to be emitted from the phase-modulation-type spatial light modulator element 13 is able to form a pattern without passing through a Fourier transform lens. Therefore, a configuration like the projection optical system 14-2 in FIG. 20 is also enabled. Note that, in a case of the configuration of FIG. 20, it is assumed that modulated light to be incident on the long-distance projection optical system 141-2 is configured not to pass through a Fourier transform lens.

Figure 21:
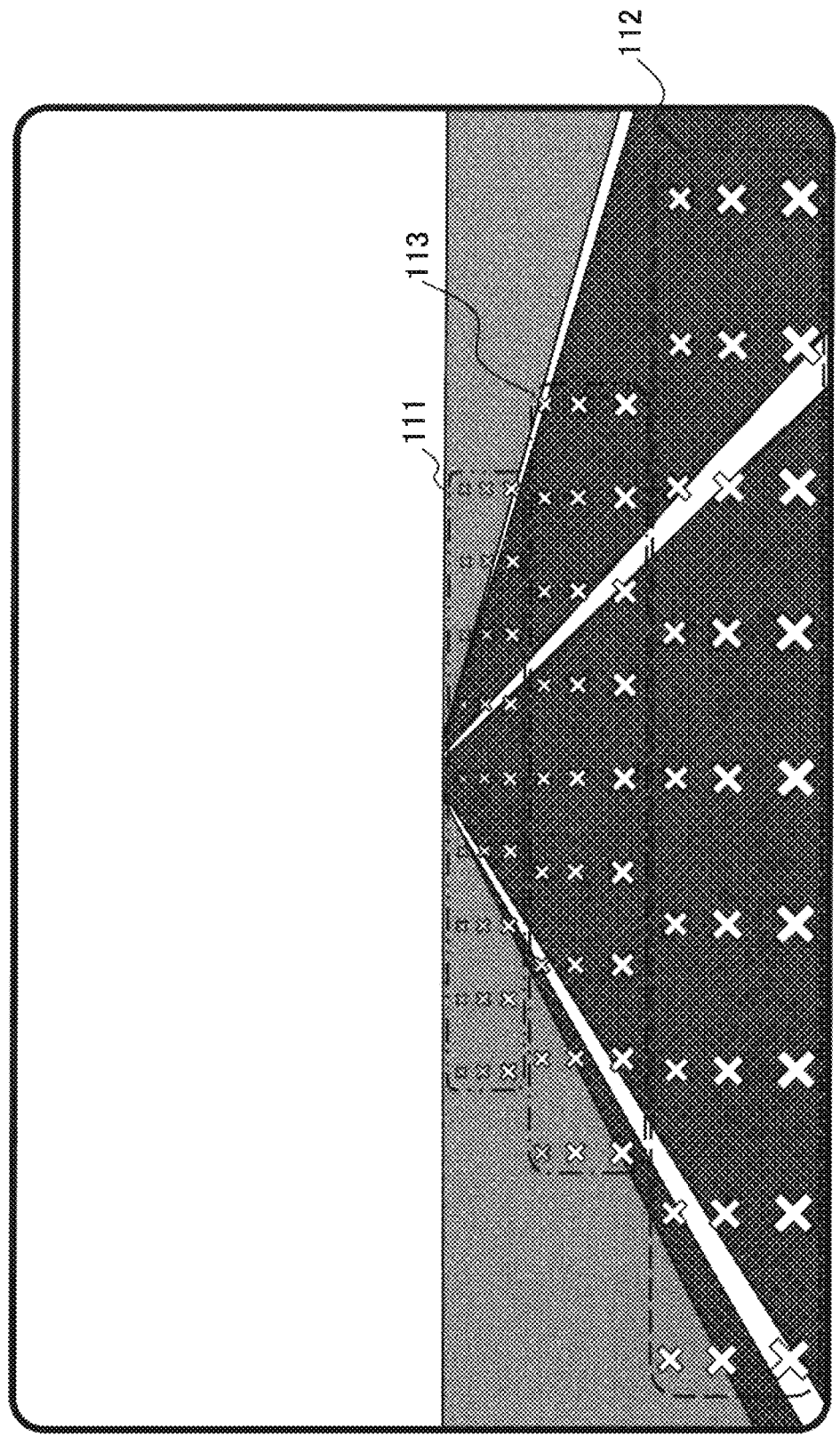
FIG. 21 is a conceptual diagram illustrating an example of a pattern to be formed by projected light from the distance measurement system according to the second example embodiment of the present invention.

FIG. 21 is a conceptual diagram illustrating an example of a pattern to be projected from the distance measurement system 2. In the example of FIG. 21, similarly to the example of FIG. 9, long-distance projected light 101 is projected onto a first projection area 111 on a side far from a vehicle, and short-distance projected light 102 is projected onto a second projection area 112 on a side near the vehicle. In addition to the above, in the example of FIG. 21, middle-distance projected light 103 is projected onto a third projection area 113 between the first projection area 111 and the second projection area 112. In the example of FIG. 21, it is possible to further enhance resolution of a target object, as compared with the example of FIG. 9, by projecting middle-distance projected light 103 onto the third projection area 113 between the first projection area 111 and the second projection area 112.

As described above, a projection system of the present example embodiment includes an optical system for projecting projected light onto a third projection area, in addition to a first projection area and a second projection area. Consequently, in the present example embodiment, as compared with the first example embodiment, it is possible to more accurately detect a target object located in a light projection area. Further, it may be possible to configure a distance measurement system associated with areas of four or more types by further adding, to a distance measurement system of the present example embodiment, a projection optical system for projecting projected light onto a different area.

(Third Example Embodiment)

Next, a configuration of a distance measurement system according to a third example embodiment of the present invention is described with reference to the drawings. In the present example embodiment, unlike the first example embodiment, a pattern for projecting onto a certain projection area is changed, when a target object is detected in the certain projection area. Note that a distance measurement system of the present example embodiment is different in terms of a control method of a control device 30, although the present example embodiment has a configuration similar to the first example embodiment.

Figure 22:
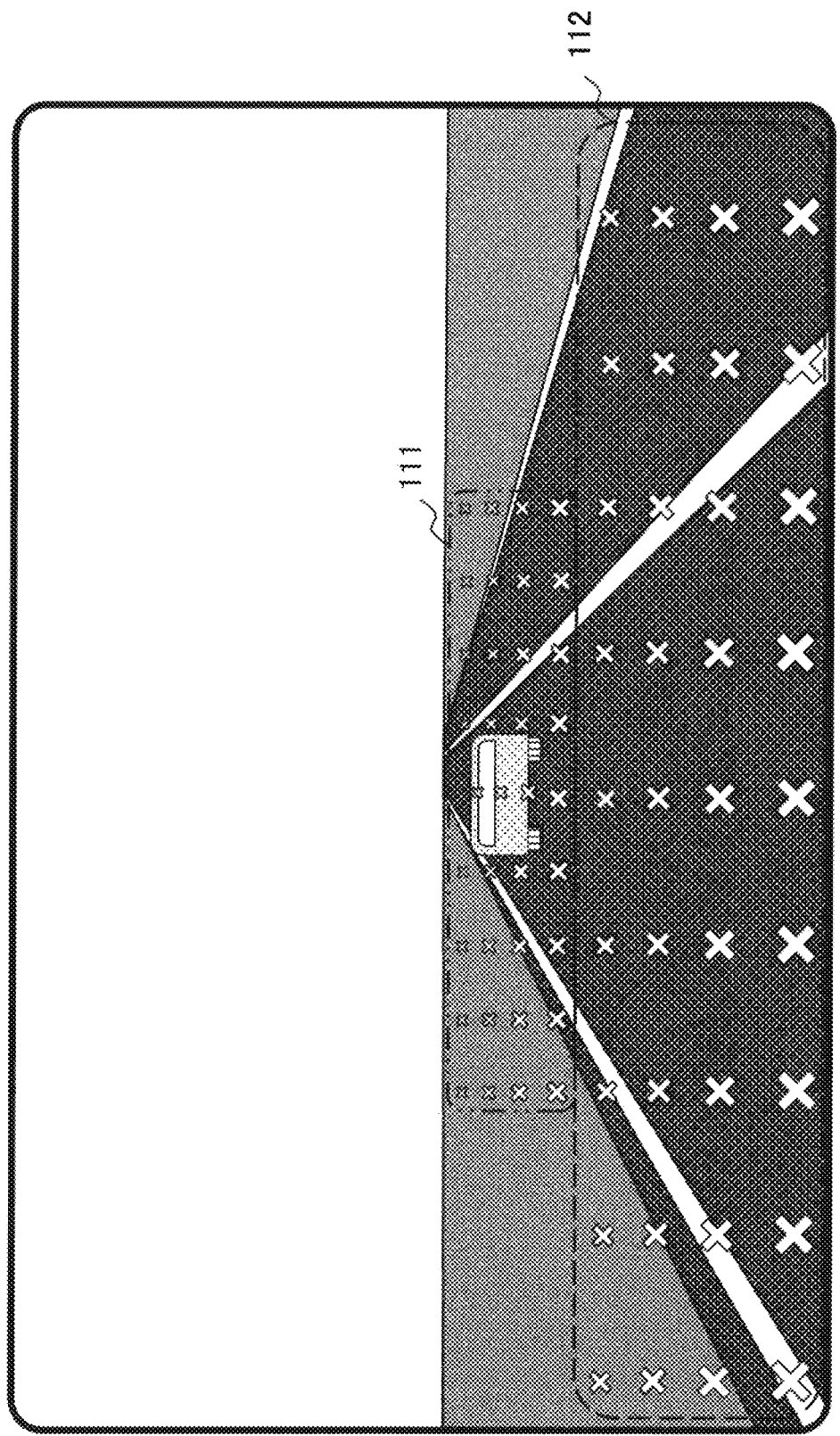
FIG. 22 is a conceptual diagram illustrating an example of a pattern to be formed by projected light from a distance measurement system according to a third example embodiment of the present invention.

FIG. 22 is a conceptual diagram illustrating an example of a pattern projected from a distance measurement system according to the present example embodiment. The example of FIG. 22 is an example in which a vehicle (target object) is located in a first projection area 111.

Figure 23:
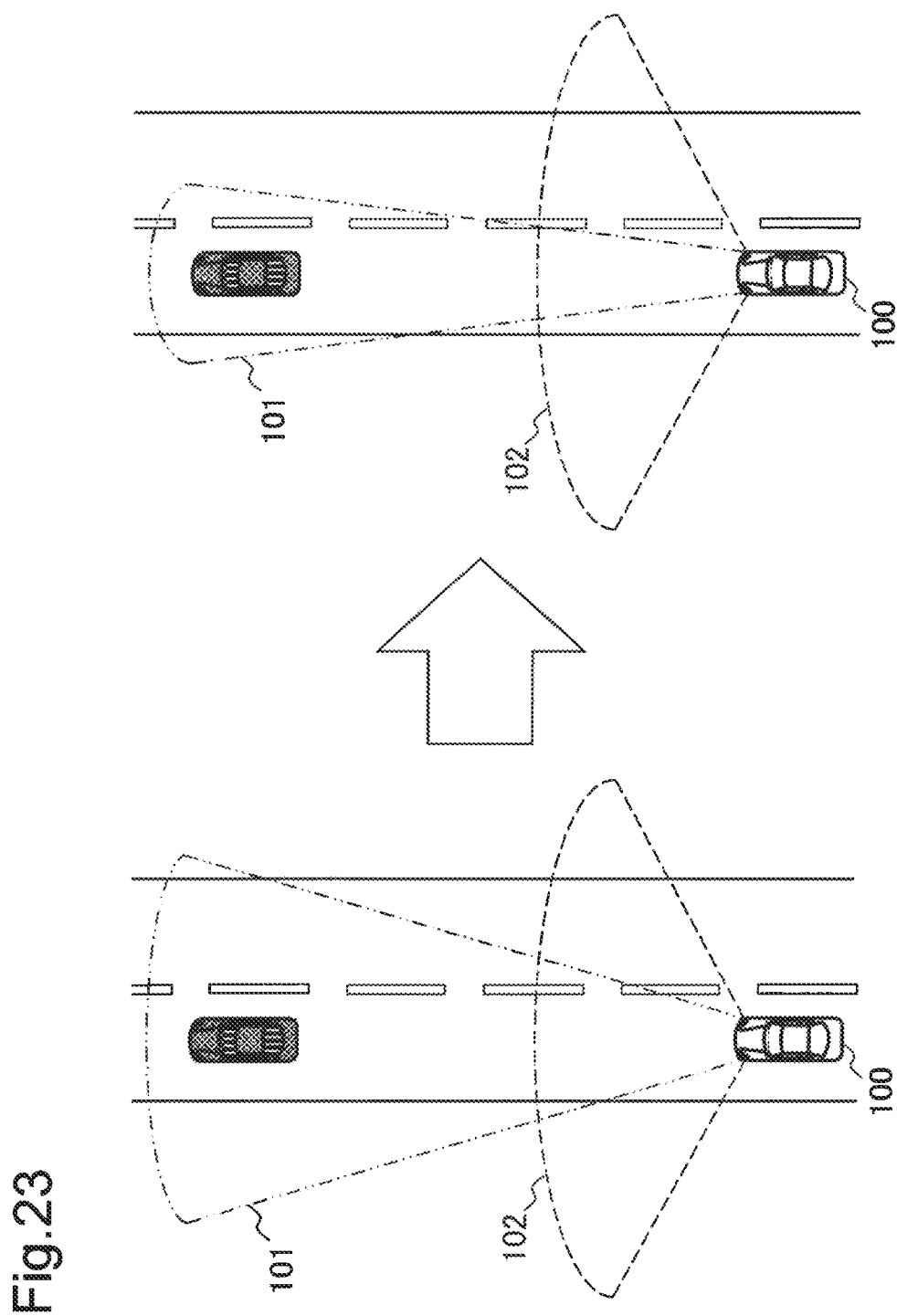
FIG. 23 is a conceptual diagram illustrating a control example of projected light to be projected from the distance measurement system according to the third example embodiment of the present invention.

FIG. 23 is a diagram illustrating an example in which a pattern is concentrated on a target object detected in the first projection area 111, when the target object is detected in the first projection area 111. A left portion of FIG. 23 illustrates a point of time when a target object is detected. A right portion of FIG. 23 illustrates a point in time when long-distance projected light 101 is concentrated on the target object, and the first projection area 111 is narrowed in such a way as to concentrate on an area including the target object.

Figure 24:
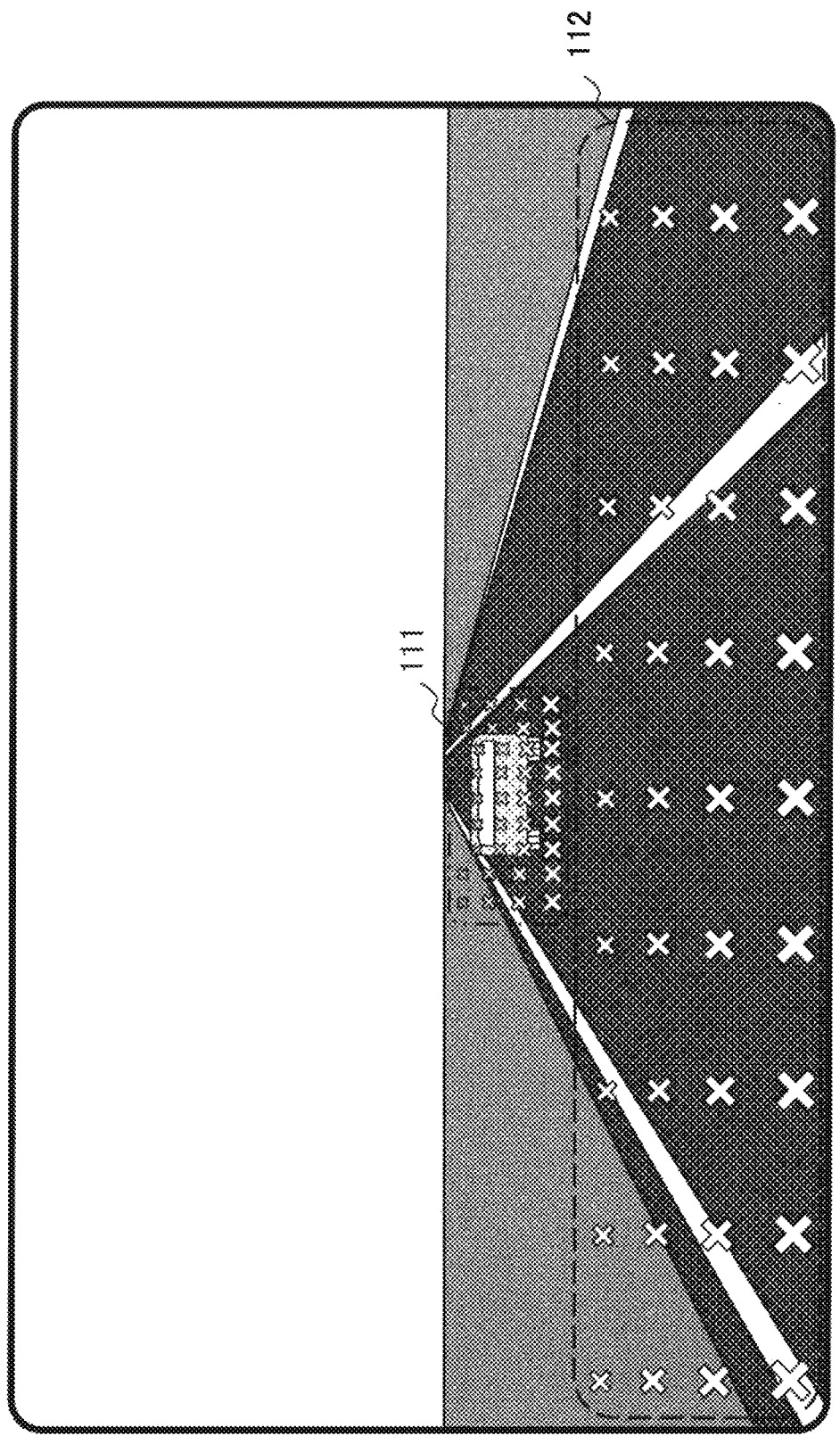
FIG. 24 is a conceptual diagram illustrating an example in which the distance measurement system according to the third example embodiment of the present invention narrows a projection area of projected light.

FIG. 24 is a conceptual diagram illustrating an example of a pattern projected from a distance measurement system at a point in time when the first projection area 111 is narrowed to an area including a target object.

In the first example embodiment, a distance to a target object is calculated from a change in captured pattern, regarding the target object detected in the first projection area 111. On the other hand, in the present example embodiment, when a target object is detected in the first projection area 111, the first projection area 111 is narrowed to increase a density of points constituting a pattern to be projected onto the first projection area 111. Narrowing the first projection area 111 to an area including a target object increases a number of points that are displaced by a target object. Therefore, it is possible to more accurately detect a distance to a target object and a shape of a target object.

[Operation]

Figure 25:
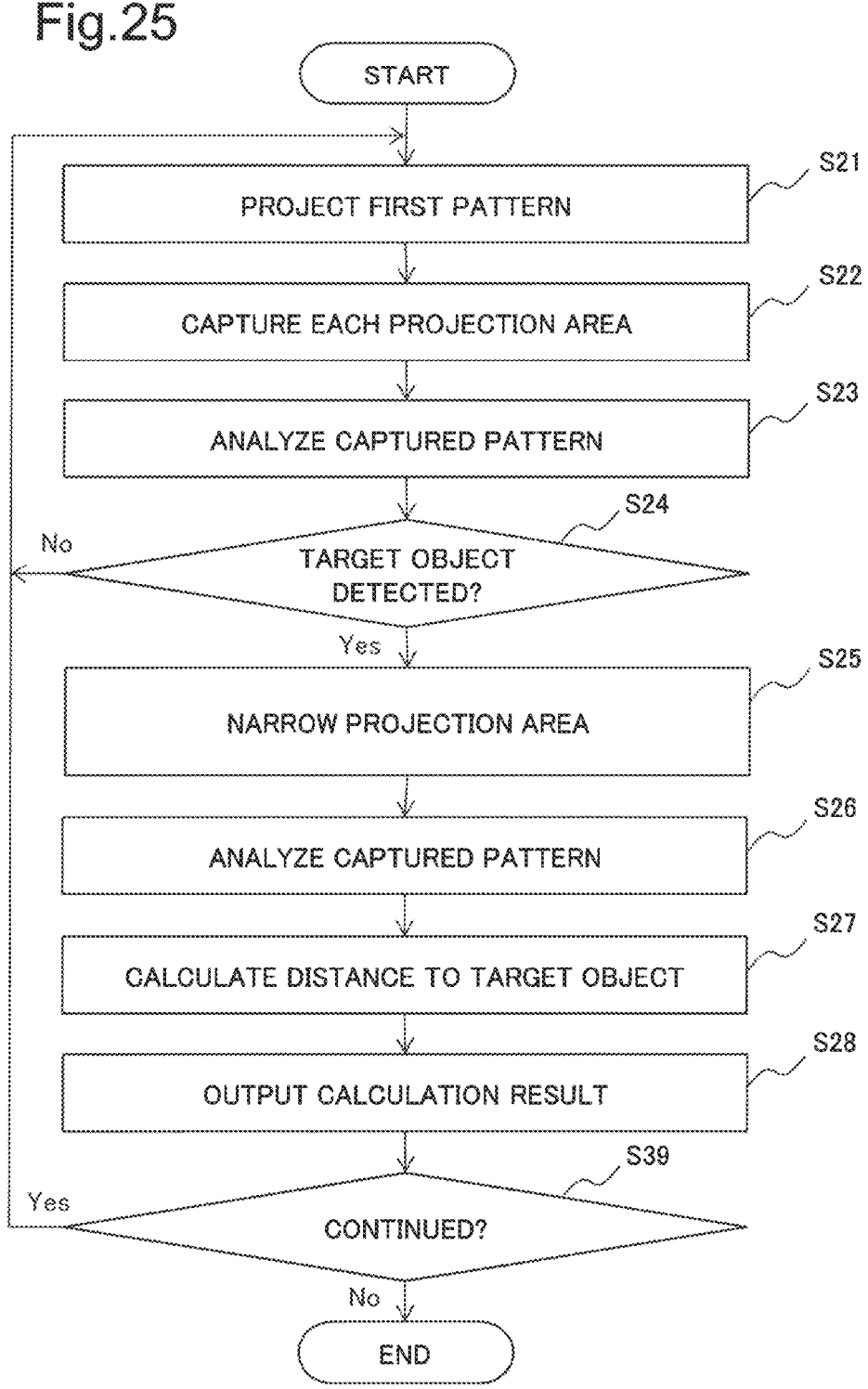
FIG. 25 is a flowchart illustrating an operation example of the distance measurement system according to the third example embodiment of the present invention.

Next, an operation example of a distance measurement system of the present example embodiment is described using a flowchart of FIG. 25. Note that, in the following description, only an overview of an operation is described, and details on data transmission and reception among constituent elements and the operation are omitted.

First, in FIG. 25, a light emitting device 10 emits a predetermined pattern toward a first projection area and a second projection area (Step S21).

A light receiving device 20 captures the first projection area and the second projection area (Step S22).

The control device 30 analyzes a pattern captured by the light receiving device 20 (Step S23).

When the control device 30 does not detect a target object (No in Step S24), the operation returns to Step S21.

When the control device 30 detects a target object (Yes in Step S24), the control device 30 narrows a projection area where the target object is detected to concentrate projected light onto the detected target object (Step S25).

Then, the control device 30 analyzes a pattern captured by the light receiving device 20 (Step S26).

The control device 30 calculates a distance to the target object (Step S27).

The control device 30 outputs the calculated distance to the target object (Step S28).

When light emission from the light emitting device 10 is continued (Yes in Step S29), the operation returns to Step S21. On the other hand, when light emission from the light emitting device 10 is finished (No in Step S29), a process in accordance with the flowchart of FIG. 25 is finished.

The foregoing is description about an operation example of a distance measurement system of the present example embodiment.

As described above, a distance measurement system of the present example embodiment narrows a certain projection area, when a target object is detected in the certain projection area. Consequently, a distance measurement system of the present example embodiment is able to more accurately perform a target object detection and distance measurement, as compared with the first example embodiment.

(Fourth Example Embodiment)

Next, a configuration of a distance measurement system according to a fourth example embodiment of the present invention is described with reference to the drawings.

Figure 26:
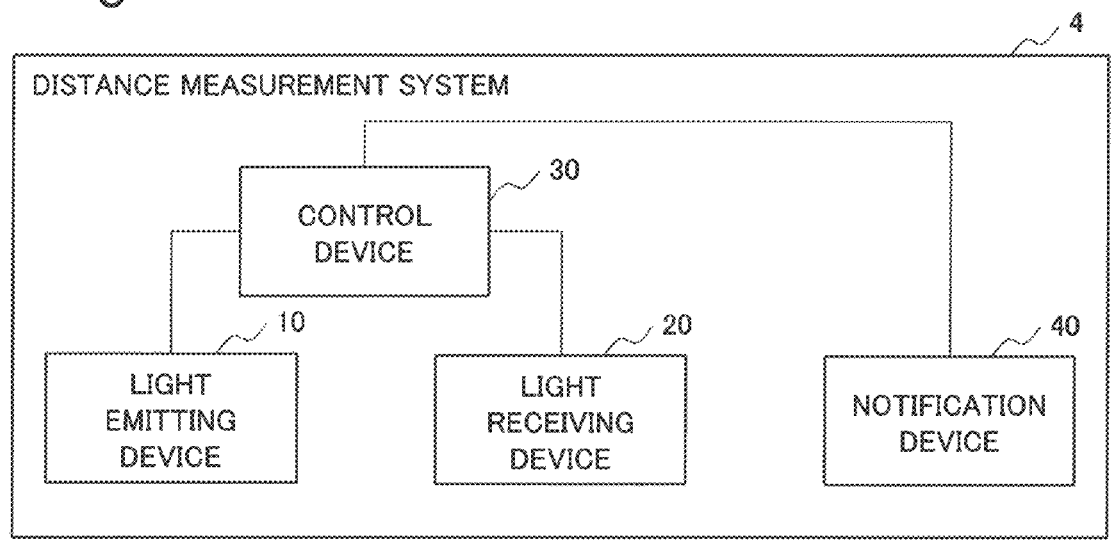
FIG. 26 is a block diagram illustrating a configuration of a distance measurement system according to a fourth example embodiment of the present invention.

FIG. 26 is a block diagram illustrating a configuration of a distance measurement system 4 of the present example embodiment. Unlike the first example embodiment, the distance measurement system 4 of the present example embodiment includes a notification device 40 for notifying an analysis result output from a control device 30, in addition to a light emitting device 10, a light receiving device 20, and the control device 30. Note that since a configuration of the distance measurement system 4 is similar to the first example embodiment except for the notification device 40, detailed description regarding a configuration other than the notification device 40 is omitted.

The notification device 40 is connected to the control device 30. The notification device 40 receives an analysis result of the control device 30, and notifies a user of the analysis result. For example, the notification device 40 is configurable as a device for causing a display device such as a screen of a navigation system to display an analysis result, and notifying a user of the analysis result as display-information. The notification device 40 may notify a user of detection of a target object, a distance to a target object, a shape of a target object, a position of a target object, and the like, as display-information. For example, the notification device 40 may cause display-information to be displayed by a head-up display for projecting display-information onto a windshield.

Figure 27:
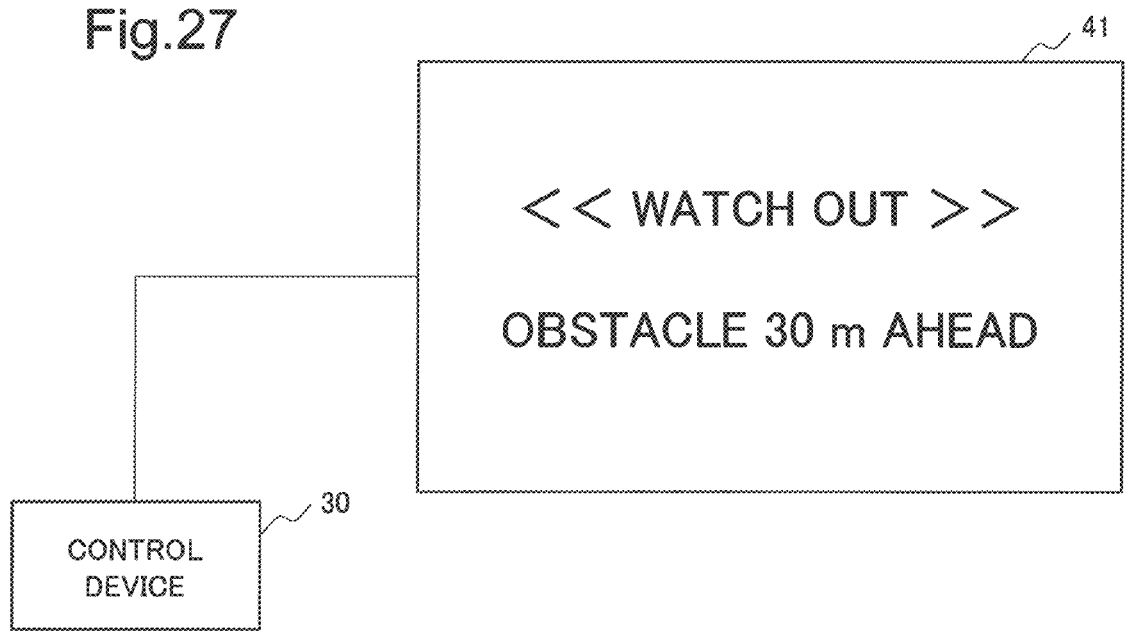
FIG. 27 is a conceptual diagram illustrating an example of a notification device in the distance measurement system according to the fourth example embodiment of the present invention.

FIG. 27 is a conceptual diagram of a display device 41 being an example of the notification device 40 for notifying an analysis result as display-information. FIG. 27 is an example in which an analysis result output from the control device 30 is displayed on the display device 41. The display device 41 is only needed to display a character and an image of a size and brightness that are visually recognizable by a driver. For example, the display device 41 is only needed to be set at a corner of a dashboard, a windshield, or the like in such a way as to be visually recognizable by a driver. Further, a screen of a navigation system mounted in a vehicle may be employed as the display device 41.

Further, for example, the notification device 40 is configurable as a device for converting an analysis result into speech information, and notifying a user of the analysis result. The notification device 40 may notify a user of detection of a target object, a distance to a target object, a shape of a target object, a position of a target object, and the like, as speech information.

Figure 28:
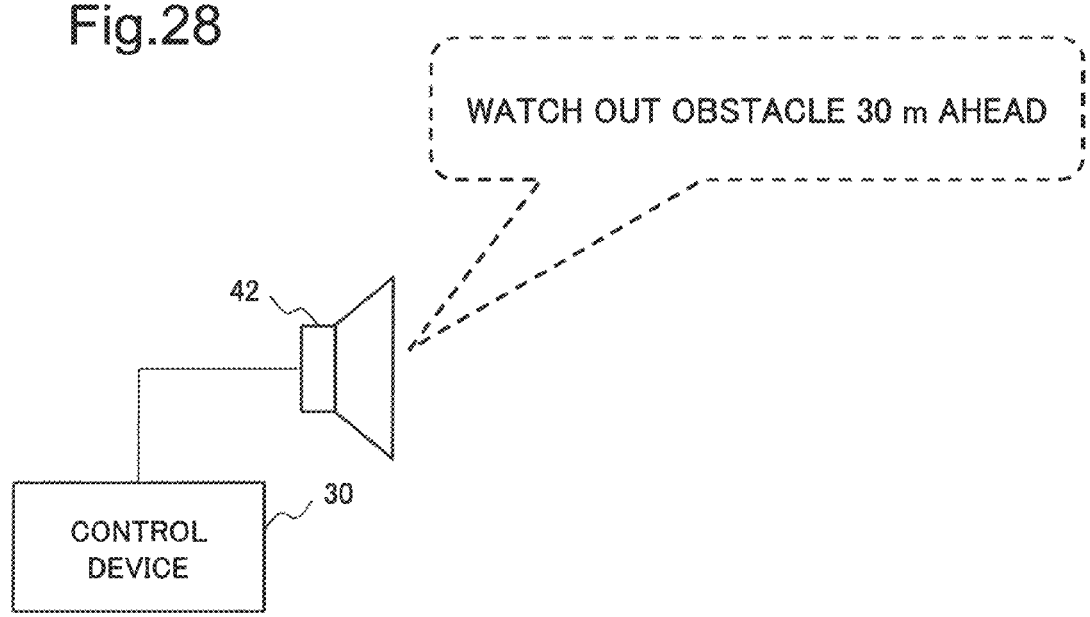
FIG. 28 is a conceptual diagram illustrating another example of the notification device in the distance measurement system according to the fourth example embodiment of the present invention.

FIG. 28 is a conceptual diagram of a speaker 42 being an example of the notification device 40 for notifying an analysis result as speech information. FIG. 28 is an example in which an analysis result output from the control device 30 is output from the speaker 42. The speaker 42 is only needed to output speech that is easy to hear by a driver. For example, the speaker 42 is only needed to be set near a dashboard, a driver's seat, or the like so that a driver can easily hear speech. Further, a speech output device mounted in a vehicle may be employed as the speaker 42.

Further, for example, the notification device 40 is configurable as a device for converting an analysis result into vibration, and notifying a user of the analysis result. The notification device 40 may notify a user that a target object is detected, a distance to a target object is short, and the like by vibration. Further, the notification device 40 may be configured to combine display-information, speech information, and vibration as necessary, and notify an analysis result.

In the foregoing, example embodiments and examples according to the present invention are described. The present invention, however, is not limited to a content described in the above-described example embodiments and examples, and a configuration and an operation of the present invention may be modified in various ways as far as the modifications do not depart from the gist of the present invention.

A part or the entirety of the above-described example embodiments may be described as follows, but is not limited to the following configuration.

(Supplementary Note 1)

A distance measurement system including:

a light emitting device including a phase-modulation-type spatial light modulator element, and configured to emit projected light for forming a pattern associated with a phase distribution displayed on a display part of the spatial light modulator element, toward at least two projection areas;

a light receiving device for capturing an area including a pattern to be formed by projected light emitted by the light emitting device; and a control device for controlling light emission from the light emitting device, verifying, for each of the projection areas, presence or absence of a target object within the projection area by analyzing imaging data captured by the light receiving device, and measuring a distance to a detected target object.

(Supplementary Note 2)

The distance measurement system according to supplementary note 1, wherein the light emitting device includes a light source for emitting light toward a display part of the spatial light modulator element, and a projection optical system for projecting light reflected by a display part of the spatial light modulator element onto the projection area, and the projection optical system includes a first optical system for projecting first projected light onto a first projection area at a first projection angle, and a second optical system for projecting second projected light onto a second projection area at a second projection angle.

(Supplementary Note 3)

The distance measurement system according to supplementary note 2, wherein the first projection area is set at a position farther than the second projection area, and the first projection area is set to be smaller than the second projection area.

(Supplementary Note 4)

The distance measurement system according to supplementary note 2 or 3, wherein the second optical system includes a lens for projecting light at the second projection angle.

(Supplementary Note 5)

The distance measurement system according to supplementary note 4, wherein the first optical system includes a lens for projecting light at the first projection angle.

(Supplementary Note 6)

The distance measurement system according to any one of supplementary notes 2 to 5, wherein the control device allocates a plurality of display areas constituting a display part of the spatial light modulator element to a first pixel group for displaying a phase distribution associated with a pattern to be formed by the first projected light, and a second pixel group for displaying a phase distribution associated with a pattern to be formed by the second projected light and causes the first pixel group and the second pixel group to display a phase distribution, and the light emitting device guides light reflected on the first pixel group to the first optical system and projects the light as the first projected light, and guides light reflected on the second pixel group to the second optical system and projects the light as the second projected light.

(Supplementary Note 7)

The distance measurement system according to supplementary note 2, wherein the light emitting device includes a third optical system for projecting third projected light onto a third projection area different from the first projection area and the second projection area, at a third projection angle.

(Supplementary Note 8)

The distance measurement system according to supplementary note 7, wherein the first projection area is set at a position farther than the third projection area, the third projection area is set at a position farther than the second projection area, the first projection area is set to be smaller than the third projection area, and the third projection area is set to be smaller than the second projection area.

(Supplementary Note 9)

The distance measurement system according to supplementary note 8, wherein the third optical system includes a lens for projecting light at the third projection angle.

(Supplementary Note 10)

The distance measurement system according to any one of supplementary notes 7 to 9, wherein the control device allocates a plurality of display areas constituting a display part of the spatial light modulator element to a first pixel group for displaying a phase distribution of a pattern to be formed by the first projected light, a second pixel group for displaying a phase distribution of a pattern to be formed by the second projected light, and a third pixel group for displaying a phase distribution of a pattern to be formed by the third projected light, and the light emitting device guides light reflected on the first pixel group to the first optical system and projects the light as the first projected light, guides light reflected on the second pixel group to the second optical system and projects the light as the second projected light, and guides light reflected on the third pixel group to the third optical system and projects the light as the third projected light.

(Supplementary Note 11)

The distance measurement system according to any one of supplementary notes 7 to 10, wherein the control device controls the light emitting device to cause a display part of the spatial light modulator element to display a phase distribution of a pattern to be formed by the first projected light, the second projected light, and the third projected light at a different timing, and controls the light receiving device to receive reflected light of the first projected light during a period when reflected light of the first projected light is incident, receive reflected light of the second projected light during a period when reflected light of the second projected light is incident, and receive reflected light of the third projected light during a period when reflected light of the third projected light is incident.

(Supplementary Note 12)

The distance measurement system according to any one of supplementary notes 1 to 11, wherein the control device causes a display part of the spatial light modulator element to display a phase distribution for forming spot light in the projection area, and controls the light emitting device to emit the spot light, and performs analysis including target object detection and distance measurement by using the spot light included in imaging data captured by the light receiving device.

(Supplementary Note 13)

The distance measurement system according to any one of supplementary notes 1 to 11, wherein the control device causes a display part of the spatial light modulator element to display a phase distribution for forming pattern light in the projection area, and controls the light emitting device to emit the pattern light, and performs analysis including target object detection and distance measurement by using the pattern light included in imaging data captured by the light receiving device.

(Supplementary Note 14)

The distance measurement system according to any one of supplementary notes 1 to 13, further including a notification device for notifying an analysis result of the control device.

(Supplementary Note 15)

The distance measurement system according to supplementary note 14, wherein the notification device notifies an analysis result of the control device by display-information.

(Supplementary Note 16)

The distance measurement system according to supplementary note 14, wherein the notification device notifies an analysis result of the control device by speech information.

(Supplementary Note 17)

A distance measurement method including:

emitting projected light for forming a pattern associated with a phase distribution displayed on a display part of a phase-modulation-type spatial light modulator element, toward at least two projection areas;

capturing an area including a pattern to be formed by emitted projected light;

verifying, for each of the projection areas, presence or absence of a target object within the projection area by analyzing captured imaging data; and measuring a distance to a detected target object.

(Supplementary Note 18)

A program recording medium recorded with a program that causes a computer to execute:

processing of emitting projected light for forming a pattern associated with a phase distribution displayed on a display part of a phase-modulation-type spatial light modulator element, toward at least two projection areas;

processing of capturing an area including a pattern to be formed by emitted projected light;

processing of verifying, for each of the projection areas, presence or absence of a target object within the projection area by analyzing captured imaging data; and processing of measuring a distance to a detected target object.

REFERENCE SIGNS LIST

1 Distance measurement system
10 Light emitting device
11 Light source
12 Collimator
13 Spatial light modulator element
14 Projection optical system
15 Light source driving power supply
16 Modulator element control circuit
17 Fourier transform lens
20 Light receiving device
21 Shutter
22 Imaging element 23 Image processing processor
24 Memory
25 Output circuit
30 Control device
31 Light emission control circuit
32 Light emission condition setting circuit
33 Storage circuit
34 Light receiving control circuit
35 Analysis circuit
36 Communication circuit
40 Notification device
41 Display device
42 Speaker
141 Long-distance projection optical system
142 Short-distance projection optical system
143 Middle-distance projection optical system
410, 420, 430 Lens

The invention claimed is:

1. A distance measurement system comprising:
a projector including a phase-modulation-type spatial light modulator element, and configured to emit projected light for forming a pattern associated with a phase distribution displayed on a display part of the spatial light modulator element, toward at least two projection areas;
a camera configured to capture an area including a pattern to be formed by projected light emitted by the projector; and
a controller configured to control light emission from the projector, to verify, for each of the projection areas, presence or absence of a target object within the projection area by analyzing imaging data captured by the camera, and to measure a distance to a detected target object,
wherein
the projector includes
a light source for emitting light toward the display part of the spatial light modulator element, and
a projection optical system for projecting light reflected by the display part of the spatial light modulator element onto the projection area, and
the projection optical system includes
a first optical system for projecting first projected light onto a first projection area at a first projection angle, and
a second optical system for projecting second projected light onto a second projection area at a second projection angle; and
wherein
the controller allocates a plurality of display areas constituting the display part of the spatial light modulator element to a first pixel group for displaying a phase distribution associated with a pattern to be formed by the first projected light, and a second pixel group for displaying a phase distribution associated with a pattern to be formed by the second projected light and causes the first pixel group and the second pixel group to display phase distributions, and
the projector guides light reflected on the first pixel group to the first optical system and projects the light as the first projected light, and guides light reflected on the second pixel group to the second optical system and projects the light as the second projected light.

2. The distance measurement system according to claim 1, wherein
the first projection area is set at a position farther than the second projection area, and
the first projection area is set to be smaller than the second projection area.

3. The distance measurement system according to claim 1, wherein
the second optical system includes a lens for projecting light at the second projection angle.

4. The distance measurement system according to claim 3, wherein
the first optical system includes a lens for projecting light at the first projection angle.

5. The distance measurement system according to claim 1, wherein
the projector includes a third optical system for projecting third projected light onto a third projection area different from the first projection area and the second projection area, at a third projection angle.

6. The distance measurement system according to claim 5, wherein
the first projection area is set at a position farther than the third projection area,
the third projection area is set at a position farther than the second projection area,
the first projection area is set to be smaller than the third projection area, and
the third projection area is set to be smaller than the second projection area.

7. The distance measurement system according to claim 6, wherein
the third optical system includes a lens for projecting light at the third projection angle.

8. The distance measurement system according to claim 5, wherein
the controller further allocates the plurality of display areas constituting the display part of the spatial light modulator element to a third pixel group for displaying a phase distribution of a pattern to be formed by the third projected light, and
the projector guides light reflected on the third pixel group to the third optical system and projects the light as the third projected light.

9. The distance measurement system according to claim 5, wherein
the controller
controls the projector to cause the display part of the spatial light modulator element to display a phase distribution of a pattern to be formed by the first projected light, the second projected light, and the third projected light at a different timing, and
controls the camera to receive reflected light of the first projected light during a period when reflected light of the first projected light is incident, receive reflected light of the second projected light during a period when reflected light of the second projected light is incident, and receive reflected light of the third projected light during a period when reflected light of the third projected light is incident.

10. The distance measurement system according to claim 1, wherein
the controller
causes the display part of the spatial light modulator element to display a phase distribution for forming spot light in the projection area, and controls the projector to emit the spot light, and performs analysis including target object detection and distance measurement by using the spot light included in imaging data captured by the camera.

11. The distance measurement system according to claim 1, wherein
the controller
causes the display part of the spatial light modulator element to display a phase distribution for forming pattern light in the projection area, and controls the projector to emit the pattern light, and
performs analysis including target object detection and distance measurement by using the pattern light included in imaging data captured by the camera.

12. The distance measurement system according to claim 1, further comprising
a notification device for notifying an analysis result of the controller.

13. The distance measurement system according to claim 12, wherein
the notification device notifies an analysis result of the controller by display-information.

14. The distance measurement system according to claim 12, wherein
the notification device notifies an analysis result of the controller by speech information.

15. A distance measurement method, comprising:
emitting, from a projector, projected light for forming a pattern associated with a phase distribution displayed on a display part of a phase-modulation-type spatial light modulator element, toward at least two projection areas comprising a first projection area and a second projection area;
capturing an area including a pattern to be formed by the emitted projected light;
verifying, for each of the projection areas, presence or absence of a target object within the projection area by analyzing captured imaging data; and
measuring a distance to a detected target object
wherein
the projector includes
a light source for emitting the emitted projected light toward the display part of the spatial light modulator element, and
a projection optical system for projecting light reflected by the display part of the spatial light modulator element onto the at least two projection areas, and
the projection optical system includes
a first optical system for projecting first projected light onto the first projection area at a first projection angle, and
a second optical system for projecting second projected light onto the second projection area at a second projection angle; and
wherein
a controller allocates a plurality of display areas constituting the display part of the spatial light modulator element to a first pixel group for displaying a phase distribution associated with a pattern to be formed by the first projected light, and a second pixel group for displaying a phase distribution associated with a pattern to be formed by the second projected light and causes the first pixel group and the second pixel group to display phase distributions, and
the projector guides light reflected on the first pixel group to the first optical system and projects the light as the first projected light, and guides light reflected on the second pixel group to the second optical system and projects the light as the second projected light.

16. A non-transitory program recording medium recorded with a program that causes a computer to execute:
processing of emitting projected light, emitted from a projector, for forming a pattern associated with a phase distribution displayed on a display part of a phase-modulation-type spatial light modulator element, toward at least two projection areas comprising a first projection area and a second projection area;
processing of capturing an area including a pattern to be formed by the emitted projected light;
processing of verifying, for each of the projection areas, presence or absence of a target object within the projection area by analyzing captured imaging data; and
processing of measuring a distance to a detected target object
wherein
the projector includes
a light source for emitting the emitted projected light toward the display part of the spatial light modulator element, and
a projection optical system for projecting light reflected by the display part of the spatial light modulator element onto the at least two projection areas, and
the projection optical system includes
a first optical system for projecting first projected light onto the first projection area at a first projection angle, and
a second optical system for projecting second projected light onto the second projection area at a second projection angle; and
wherein
the computer further executes allocating a plurality of display areas constituting the display part of the spatial light modulator element to a first pixel group for displaying a phase distribution associated with a pattern to be formed by the first projected light, and a second pixel group for displaying a phase distribution associated with a pattern to be formed by the second projected light and causes the first pixel group and the second pixel group to display phase distributions, and
the projector guides light reflected on the first pixel group to the first optical system and projects the light as the first projected light, and guides light reflected on the second pixel group to the second optical system and projects the light as the second projected light.

* * * * *